United States Patent
Kamijima

(10) Patent No.: US 6,785,952 B2
(45) Date of Patent: Sep. 7, 2004

(54) METHOD FOR MANUFACTURING A THIN FILM MAGNETIC HEAD

(75) Inventor: Akifumi Kamijima, Tokyo (JP)

(73) Assignee: TDK Corporation, Tokyo (JP)

( * ) Notice: Subject to any disclaimer, the term of this patent is extended or adjusted under 35 U.S.C. 154(b) by 283 days.

(21) Appl. No.: 10/076,319

(22) Filed: Feb. 19, 2002

(65) Prior Publication Data

US 2002/0071211 A1 Jun. 13, 2002

Related U.S. Application Data

(62) Division of application No. 09/369,253, filed on Aug. 6, 1999, now Pat. No. 6,373,657.

(30) Foreign Application Priority Data

Aug. 6, 1998 (JP) ............................................. 10-222769

(51) Int. Cl.[7] ........................... G11B 5/127; H04R 31/00
(52) U.S. Cl. ................................ 29/603.13; 29/603.14; 29/603.15; 29/603.16; 29/603.18; 360/122; 360/126; 360/317
(58) Field of Search ............ 29/603.09, 603.13–603.16, 29/603.18; 360/122, 126, 319

(56) References Cited

U.S. PATENT DOCUMENTS

| | | | |
|---|---|---|---|
| 4,652,954 A | 3/1987 | Church | |
| 4,716,484 A | 12/1987 | Kaminaka et al. | 360/126 |
| 5,126,907 A | 6/1992 | Hamakawa et al. | 360/126 |
| 5,245,493 A | 9/1993 | Kawabe et al. | 360/122 |
| 5,402,295 A | 3/1995 | Suzuki et al. | 360/122 |
| 5,710,510 A * | 1/1998 | Seagle et al. | 324/210 |
| 5,726,841 A | 3/1998 | Tong et al. | 360/122 |
| 5,831,792 A | 11/1998 | Ananth | 360/122 |
| 5,850,326 A | 12/1998 | Takano et al. | 360/122 |
| 5,910,871 A | 6/1999 | Kawanami et al. | 360/122 |
| 5,991,110 A | 11/1999 | Sakai et al. | 360/122 |
| 5,995,343 A | 11/1999 | Imamura | 360/122 |
| 5,999,380 A | 12/1999 | Slade et al. | 360/122 |
| 6,032,353 A * | 3/2000 | Hiner et al. | 29/603.14 |
| 6,040,965 A | 3/2000 | Terunuma et al. | 360/122 |
| 6,055,137 A | 4/2000 | Ishiwata et al. | 360/126 |
| 6,104,576 A | 8/2000 | Santini | 360/126 |
| 6,130,805 A | 10/2000 | Sasaki et al. | 360/126 |
| 6,172,848 B1 * | 1/2001 | Santini | 360/126 |
| 6,223,813 B1 * | 5/2001 | Chrysler et al. | 165/185 |

FOREIGN PATENT DOCUMENTS

JP      57162115 A   * 10/1982     ............ G11B/5/12

OTHER PUBLICATIONS

K. Fukuda et al., "Off–track Capability of a Pole Trimmed Thin Film Head", *IEEE Transactions on Magnetics*, vol. 30, No. 6, Nov. 1994, pp. 3891–3893.

H. Takano et al., "Submicron–Trackwidth Inductive/MR Composite Head", *IEEE Transactions on Magnetics*, vol. 27, No. 6, Nov. 1991, pp. 4678–4683.

* cited by examiner

*Primary Examiner*—A. Dexter Tugbang
*Assistant Examiner*—Paul D Kim
(74) *Attorney, Agent, or Firm*—Oliff & Berridge, PLC

(57) ABSTRACT

A first magnetic film, a gap film, a thin film coil supported by a insulated film and a second magnetic film are formed in turn. The second magnetic film has a pole part opposite to the first magnetic film via the gap film and a yoke part extending backward from the pole part to be magnetically connected to the first magnetic film. The forefront surface of the yoke part is receded from an air bearing surface. The pole part of the second magnetic film has a step d1 in a running direction of a magnetic recording medium and a step d2 in the perpendicular direction to the running direction within the yoke forefront surface and its periphery as is viewed from the yoke forefront surface. A protective film embeds the steps d1 and d2, and covers an inductive type thin film magnetic head element entirely. Thereby, without debasing the overwrite characteristic when the pole part is miniaturized, a thin film magnetic head having a narrowed track width can be provided.

7 Claims, 20 Drawing Sheets

FIG_2
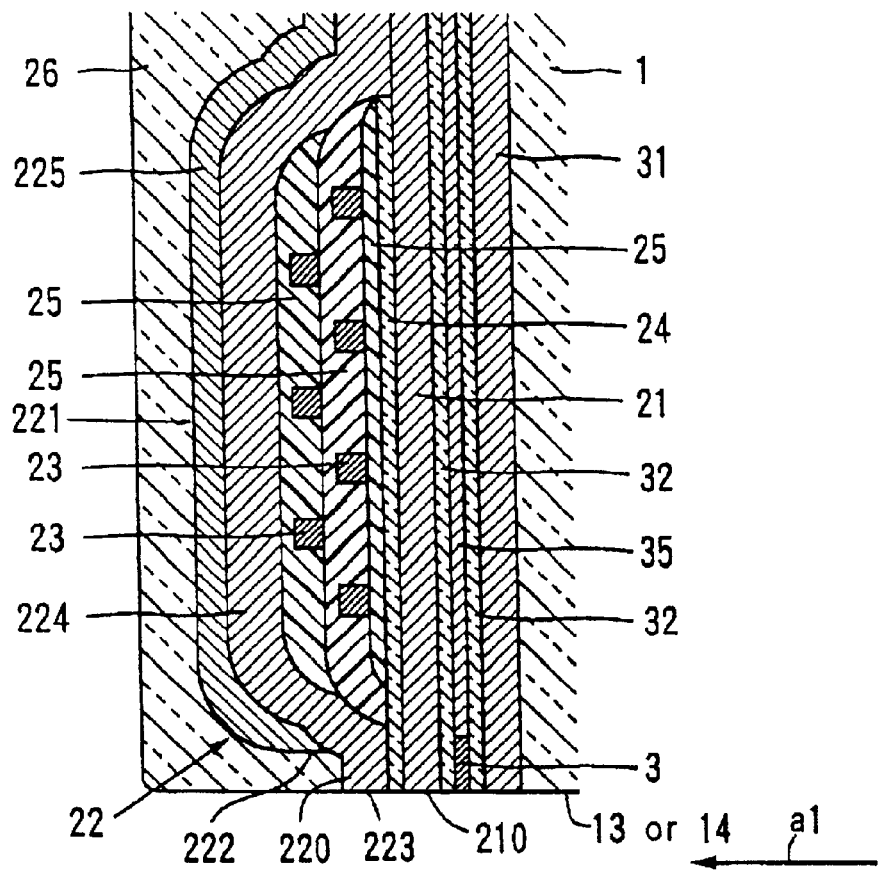
FIG.3
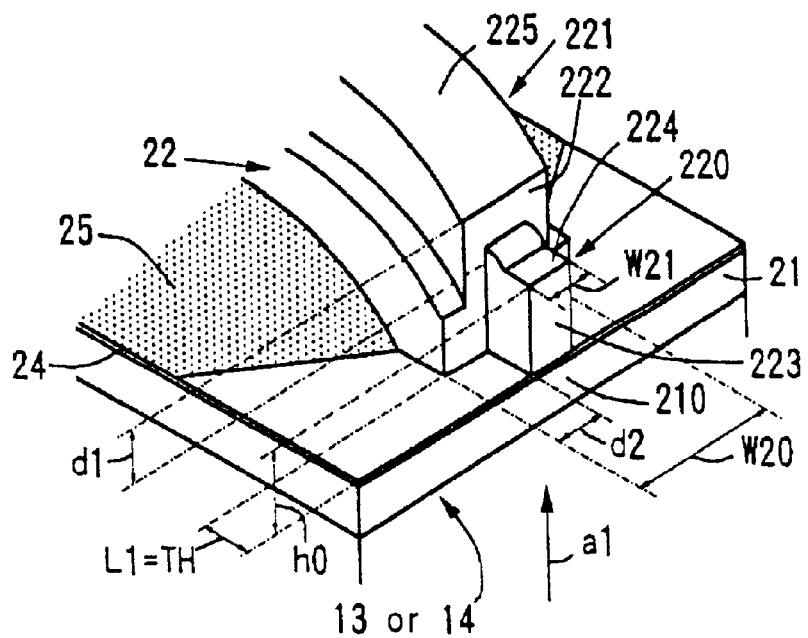

FIG_4
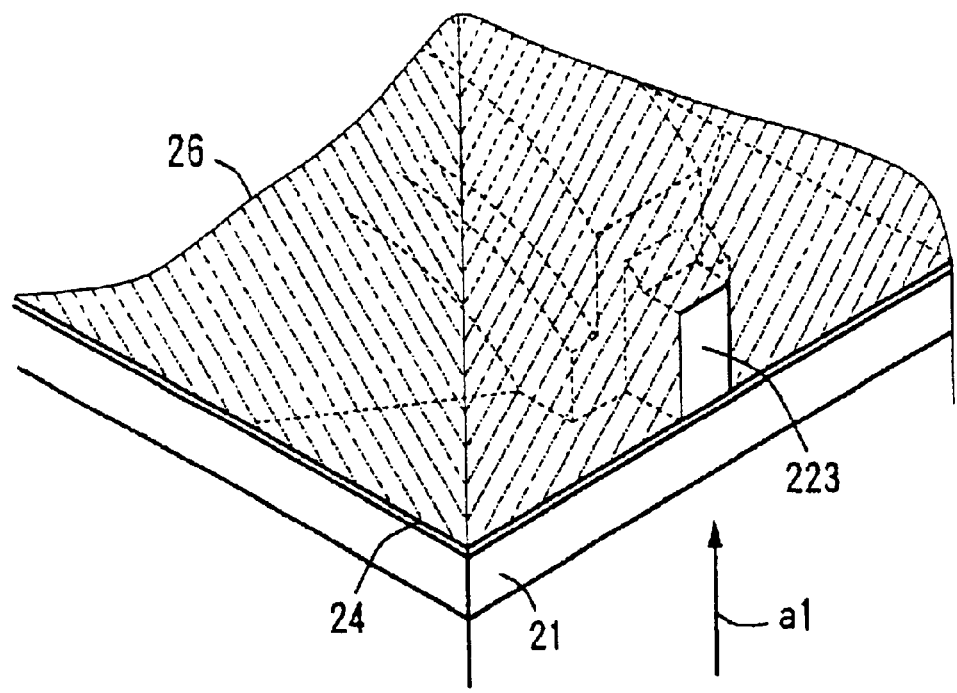
FIG_5
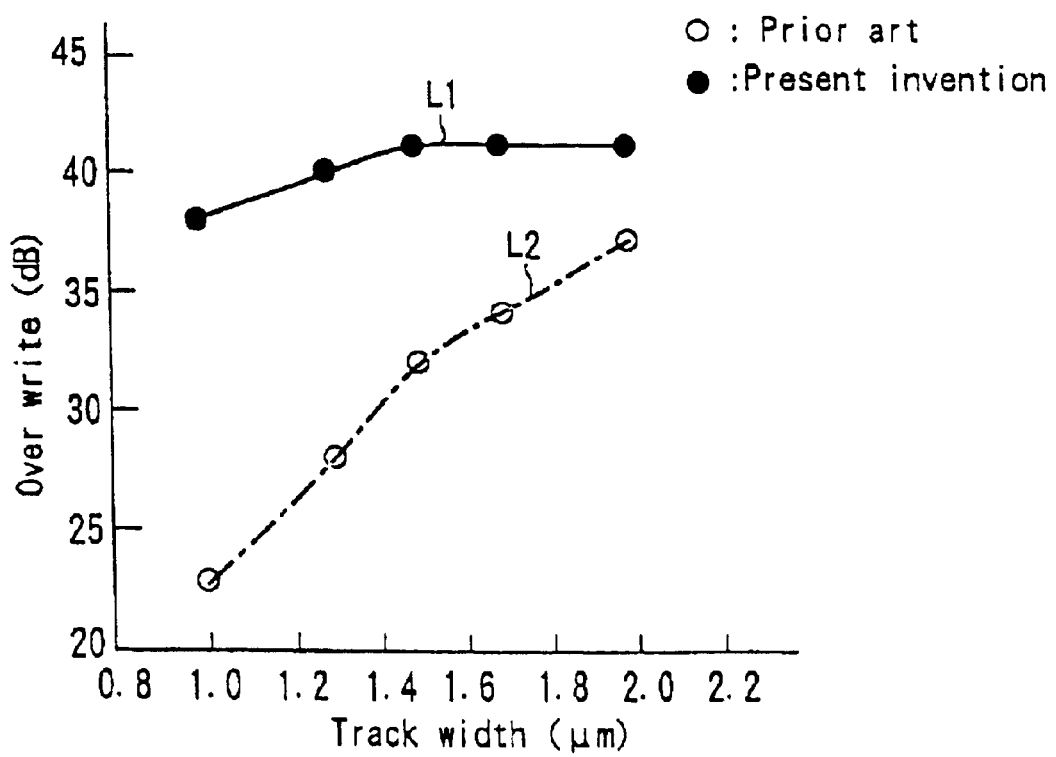

FIG_9
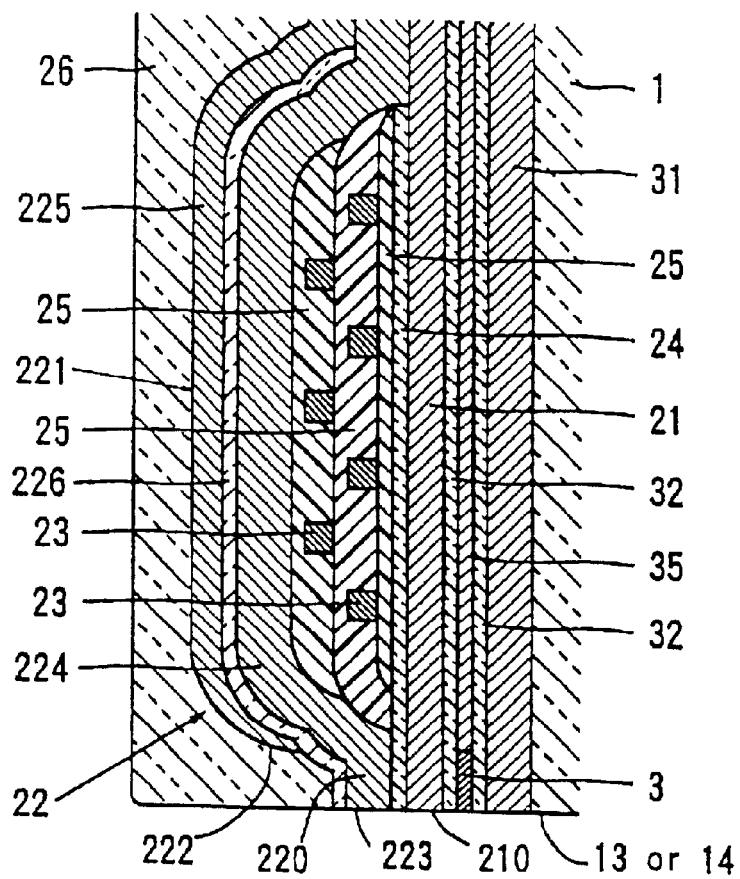
FIG_10
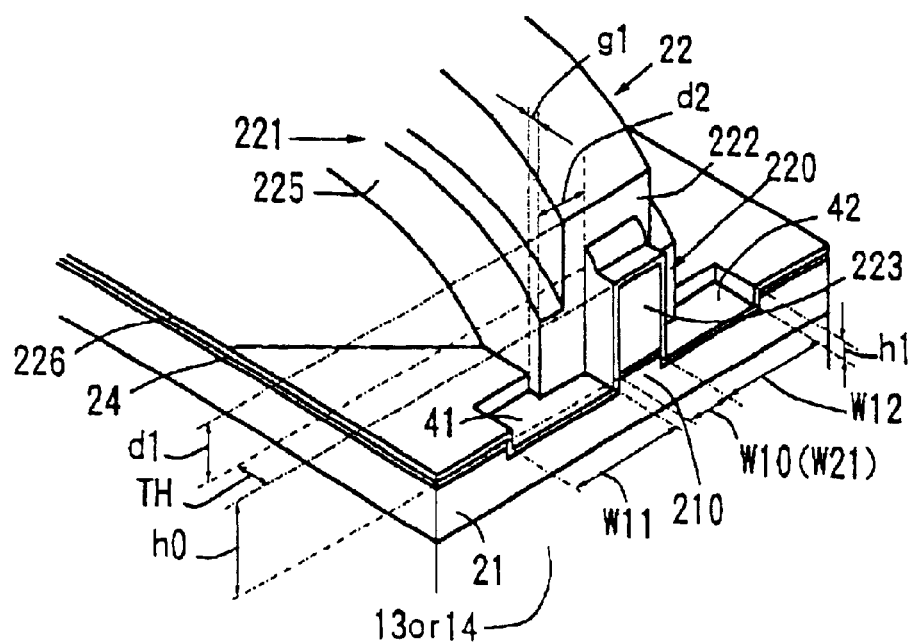

FIG._11
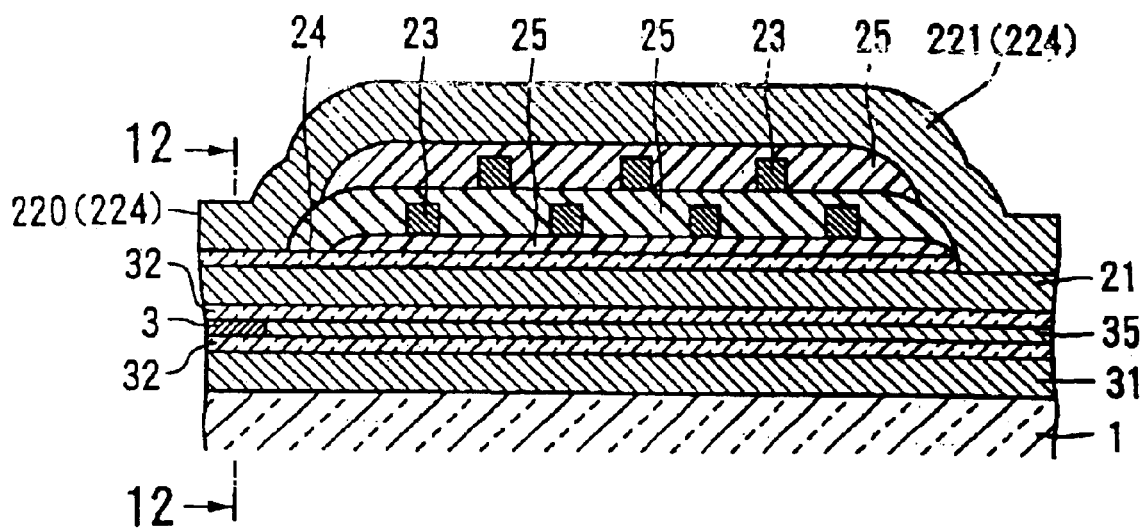
FIG._12
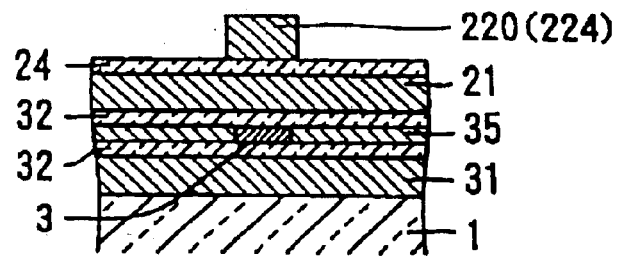
FIG._13
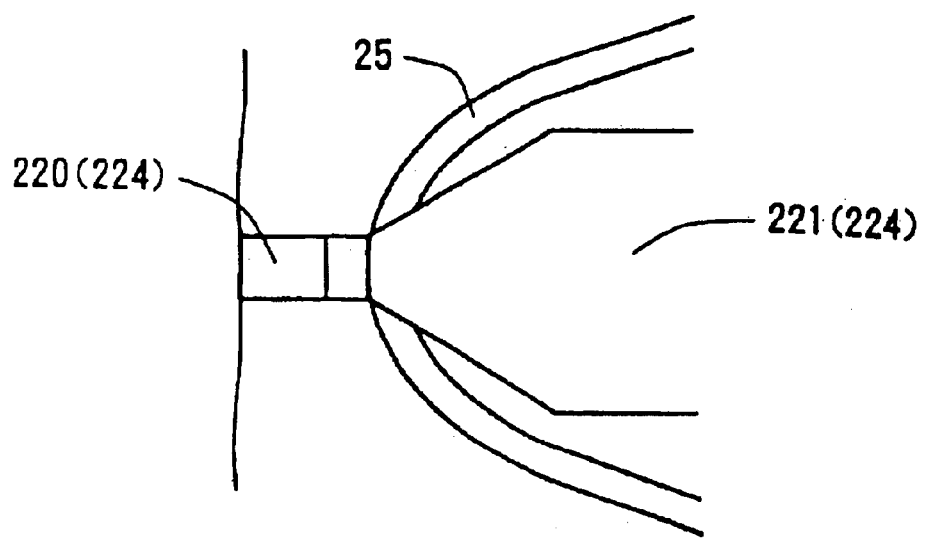

FIG._14
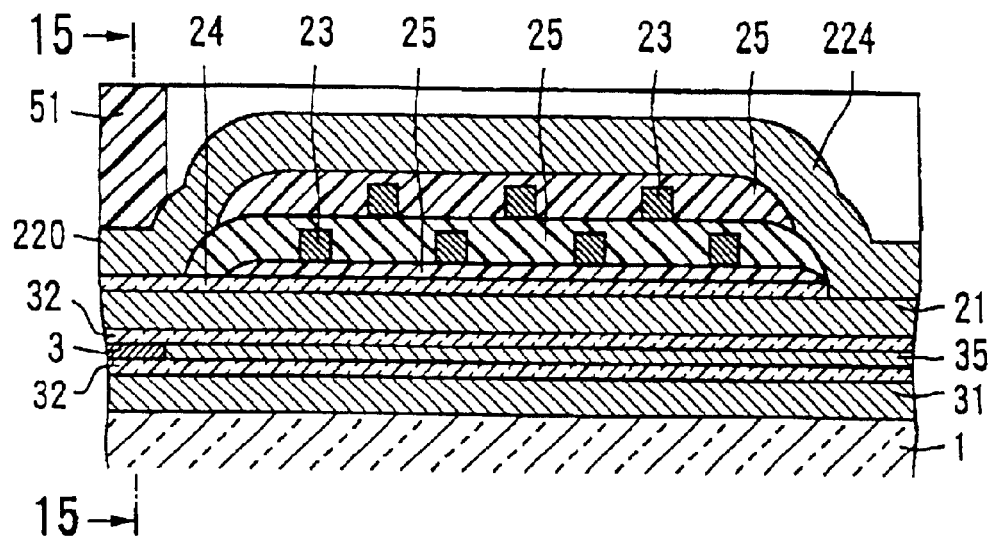
FIG._15
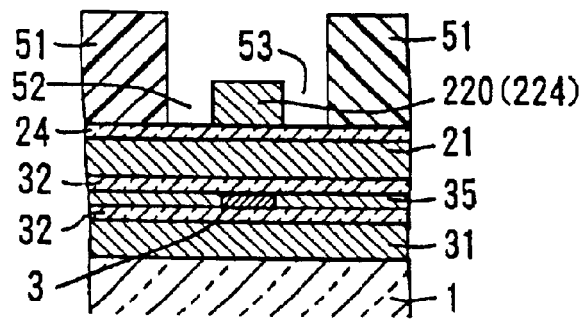
FIG._16
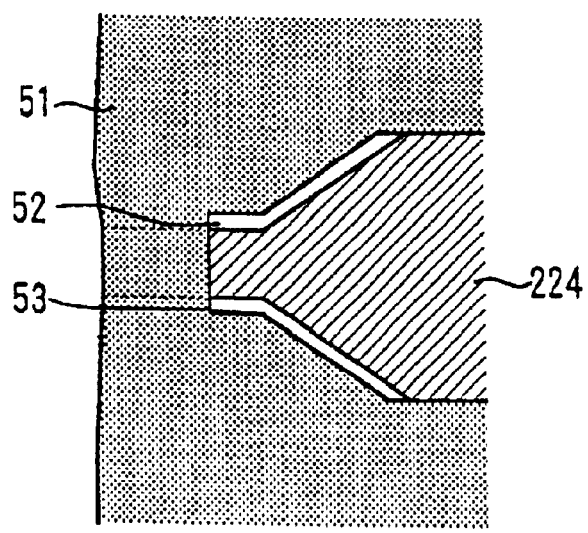

FIG_17
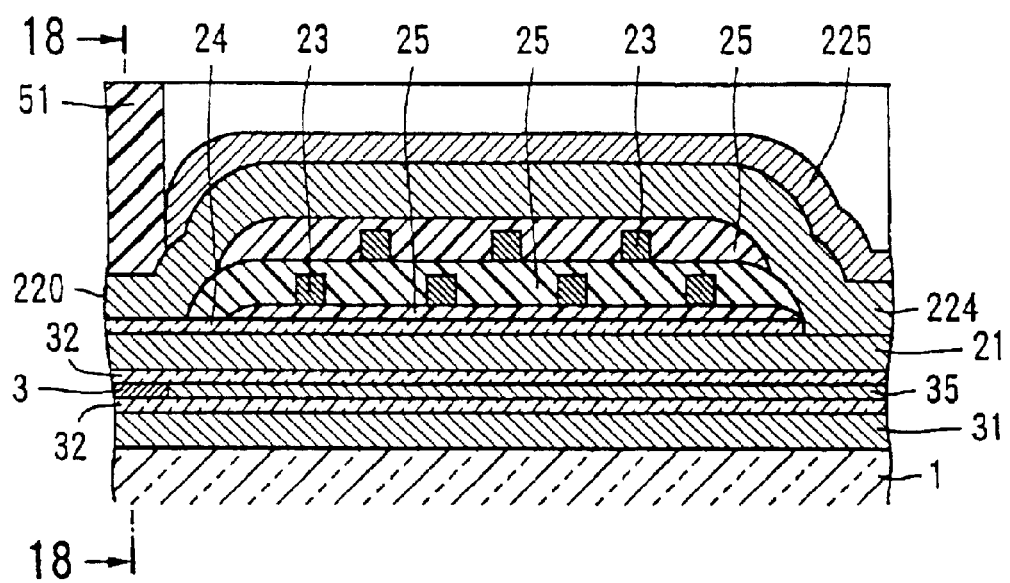
FIG_18
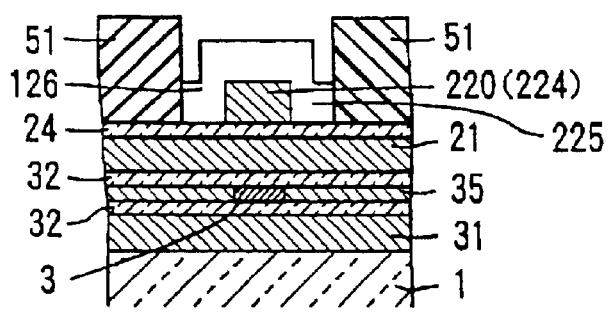
FIG_19
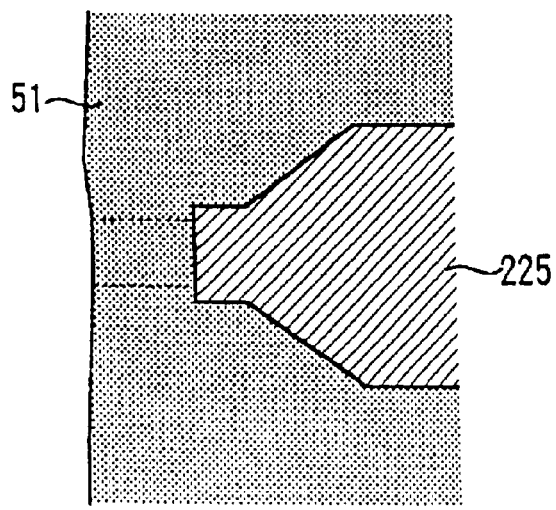

FIG_20
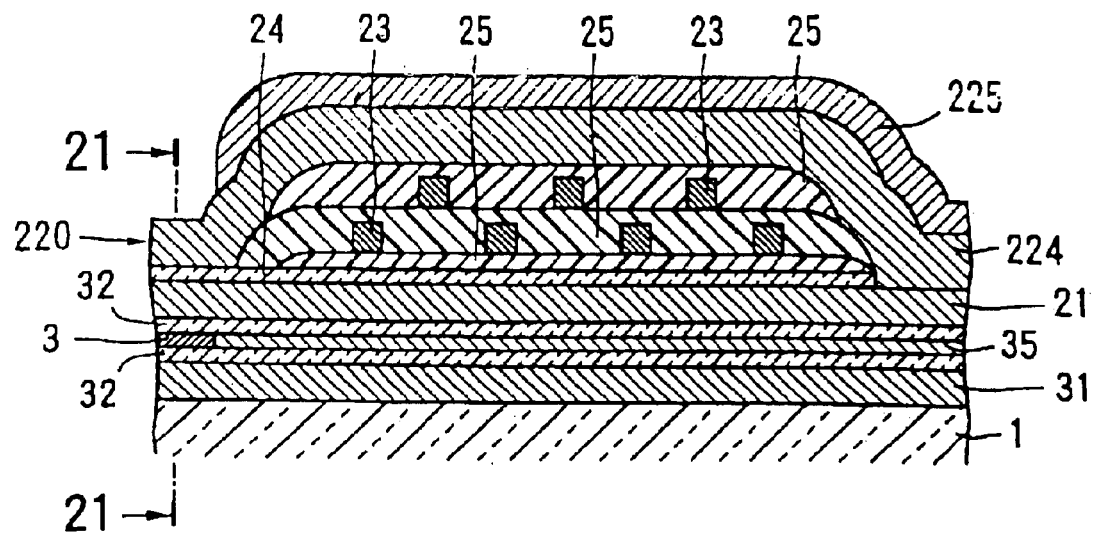
FIG_21
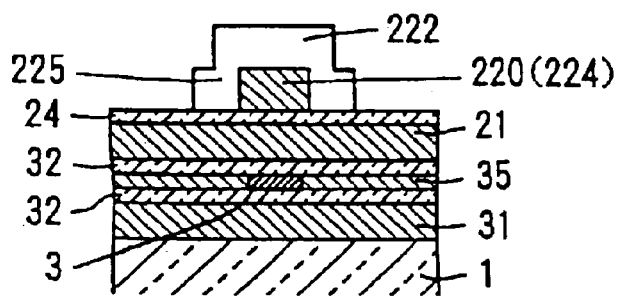
FIG_22
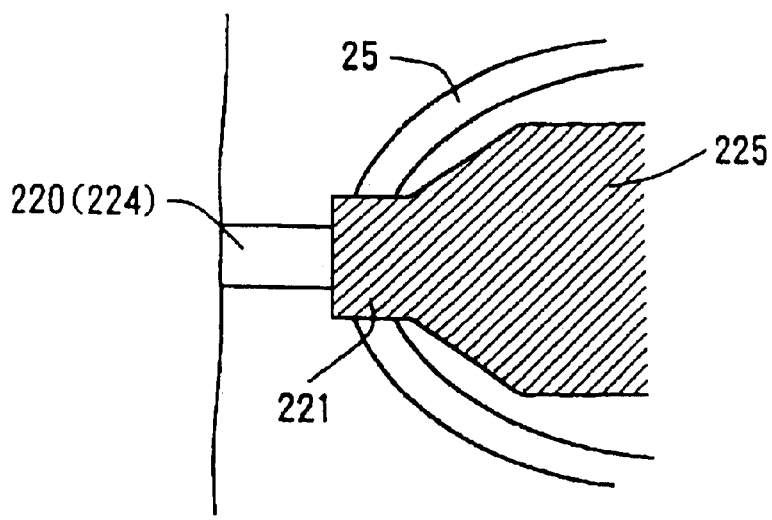

FIG_23
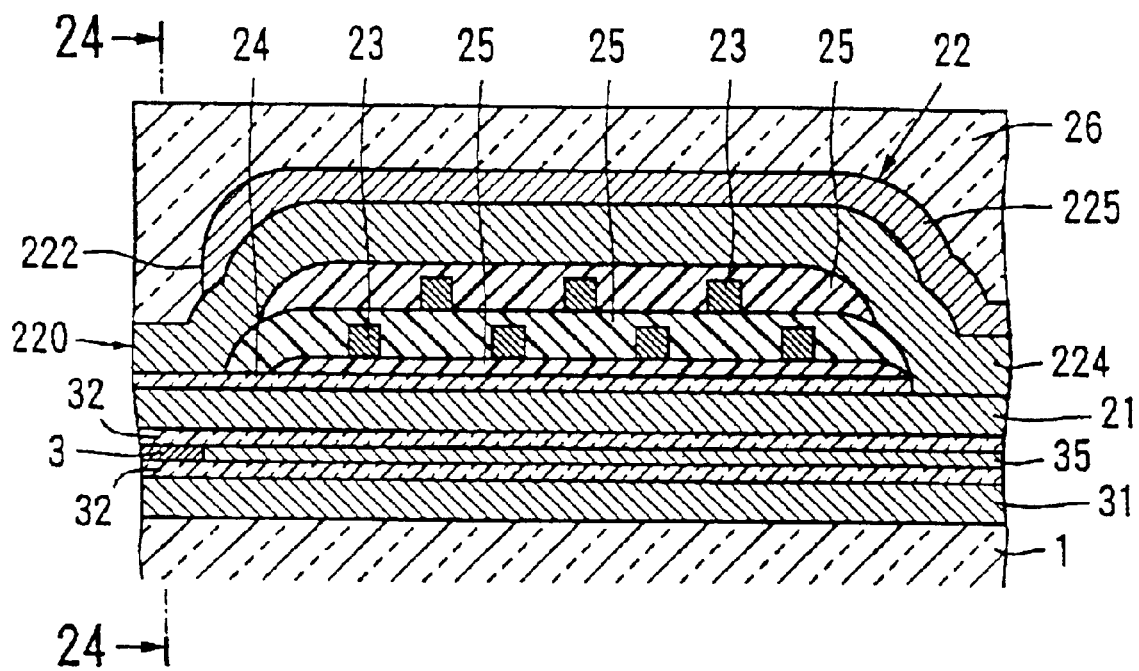
FIG_24
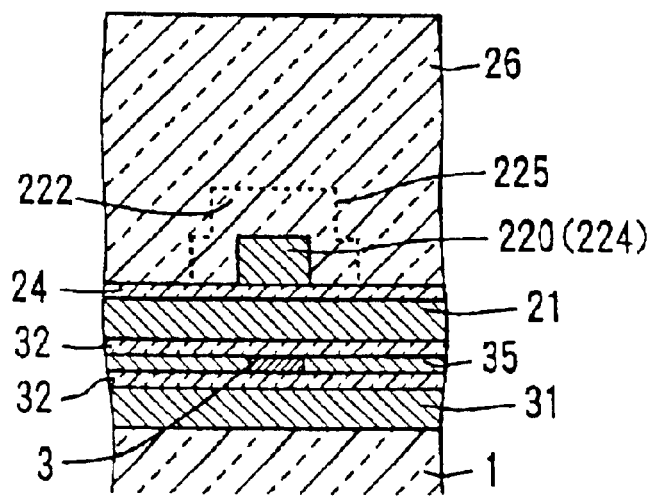

*FIG._25*
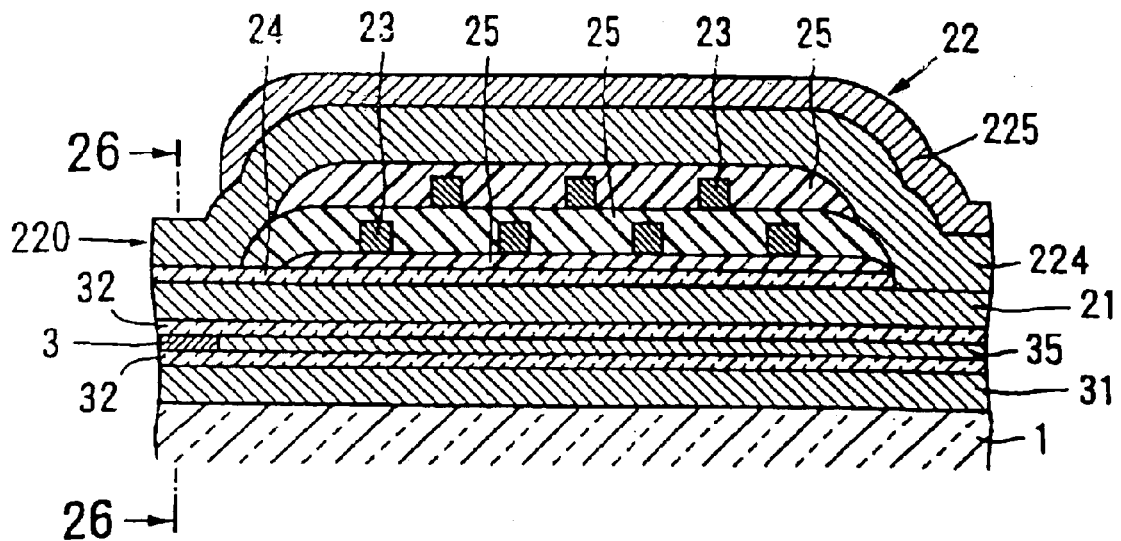
*FIG._26*
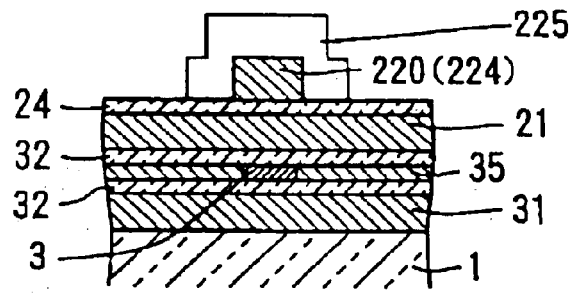
*FIG._27*
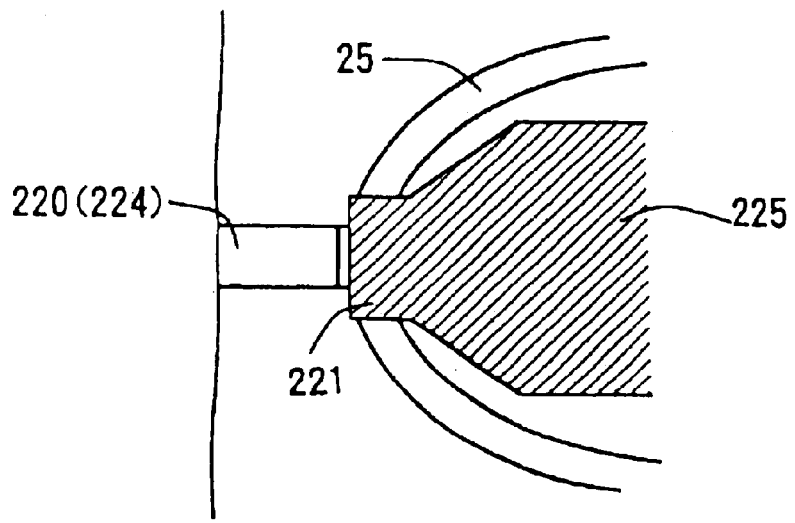

FIG_31
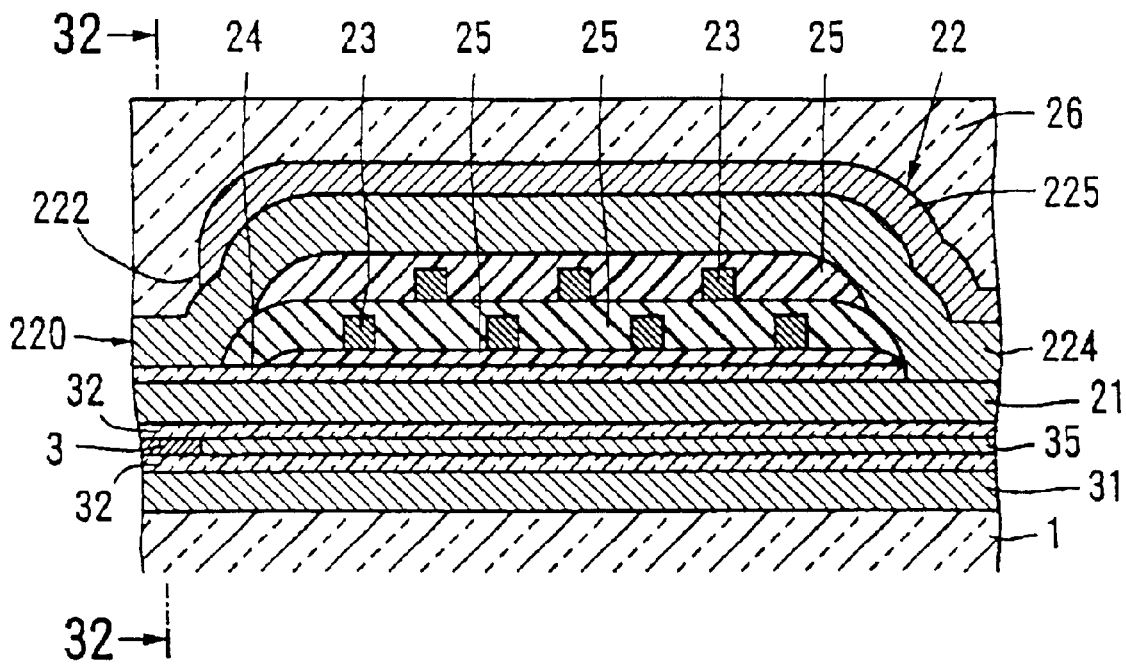
FIG_32
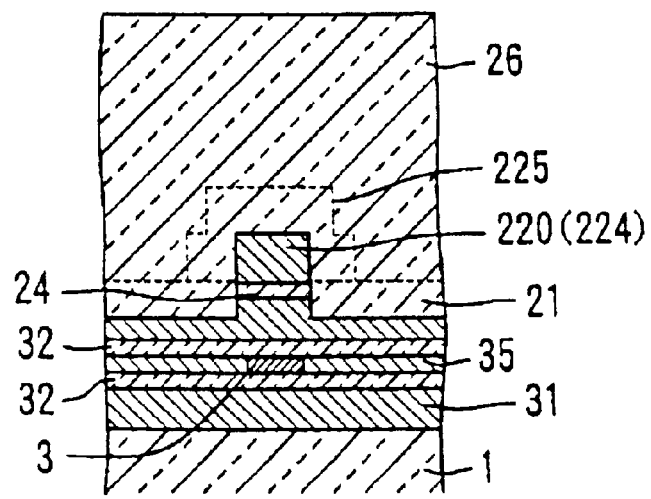

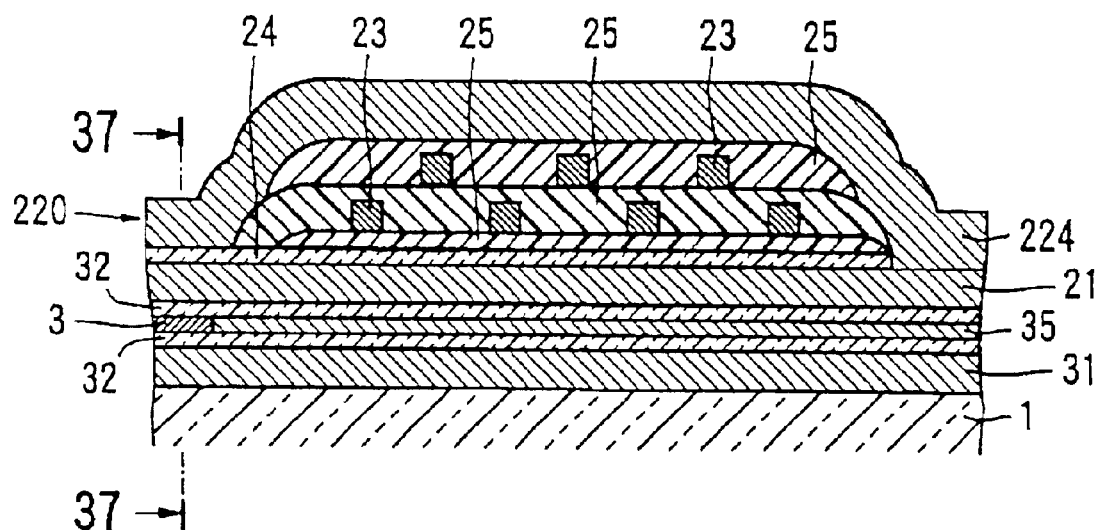
FIG_36
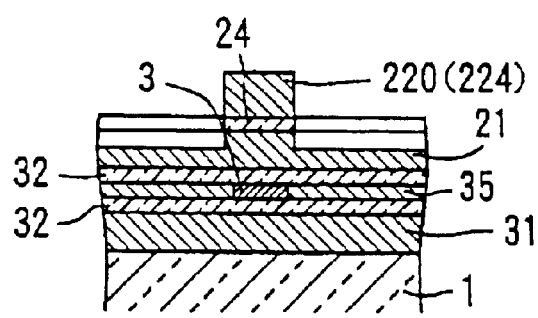
FIG_37
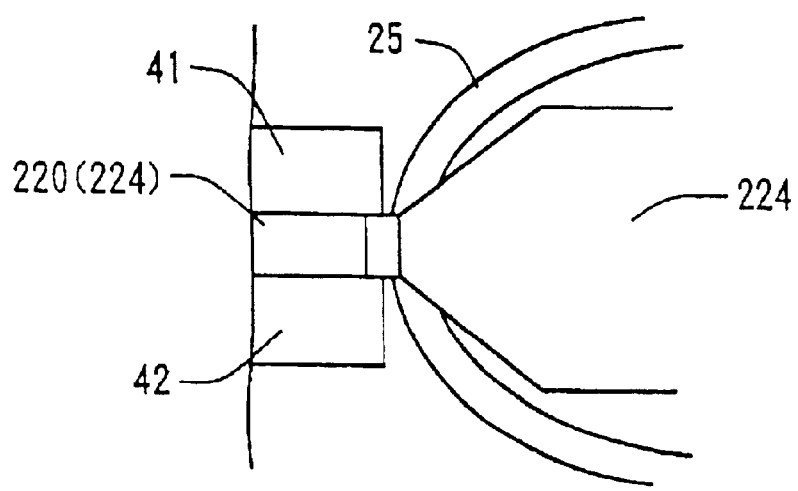
FIG_38

FIG._42
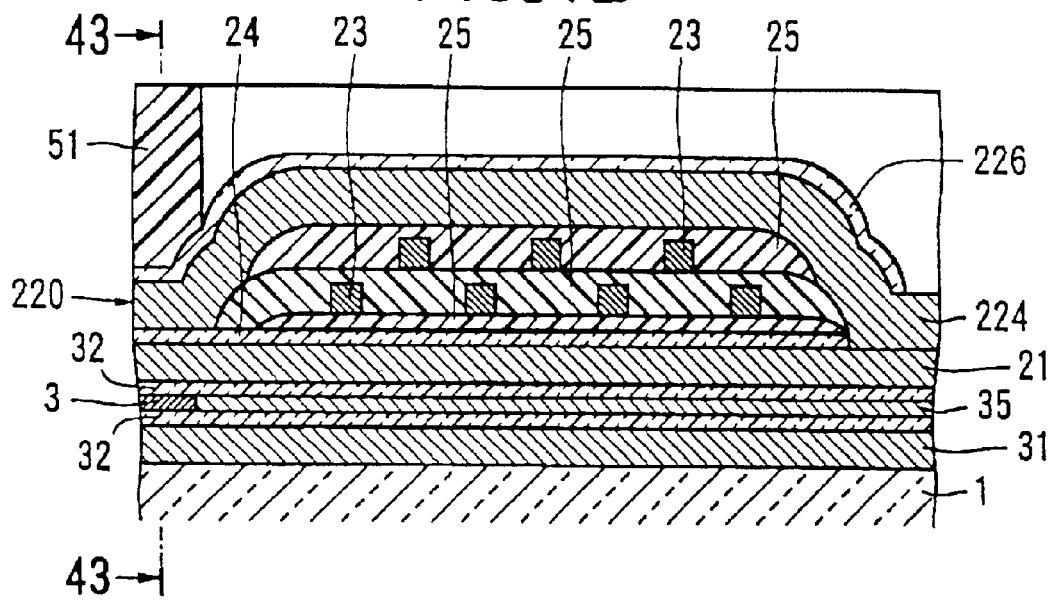
FIG._43
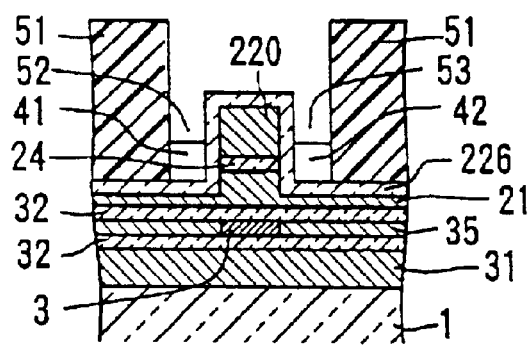
FIG._44
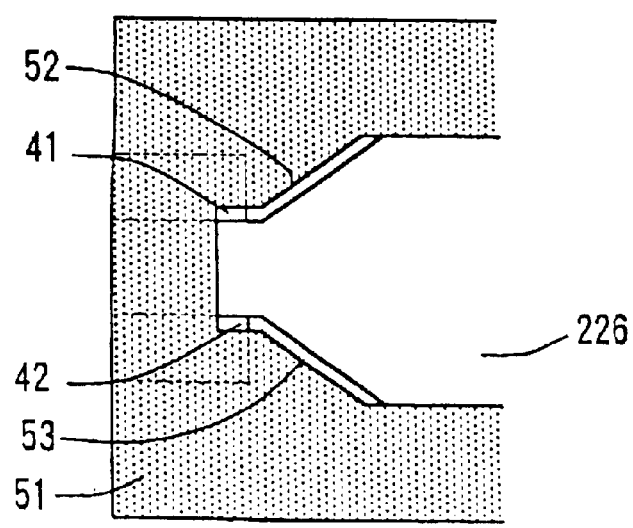

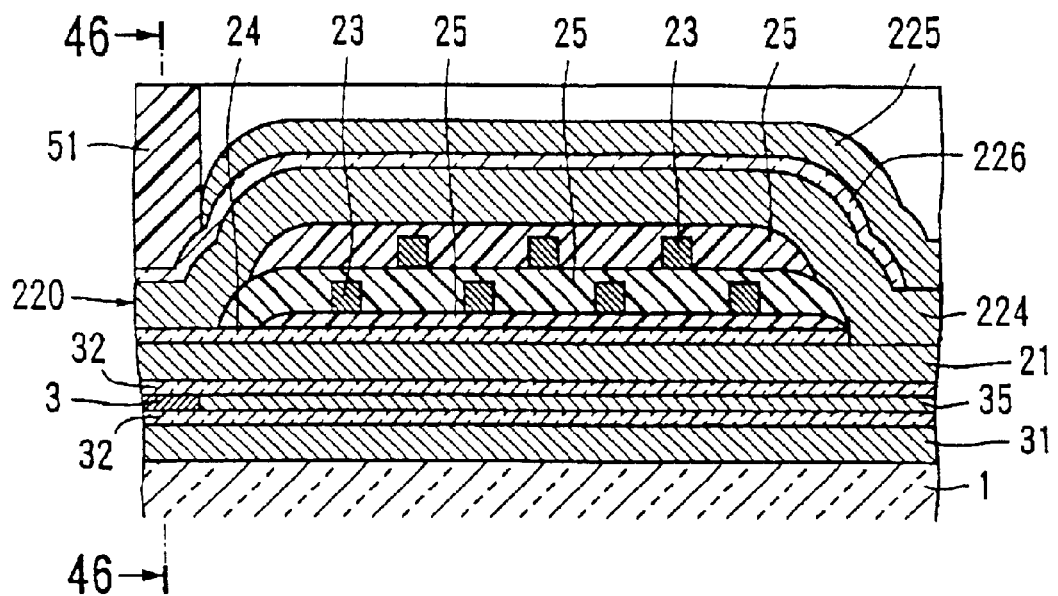
FIG._45
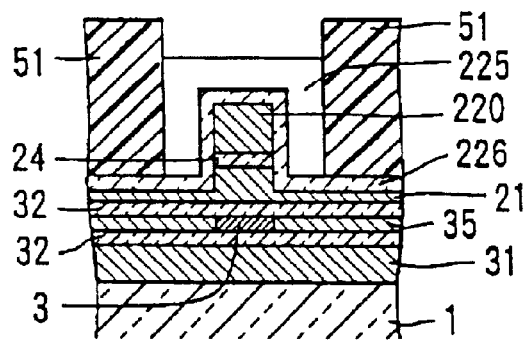
FIG.46
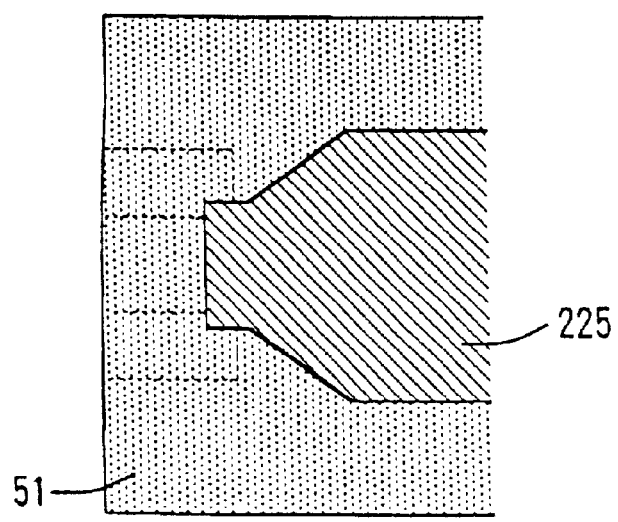
FIG._47

METHOD FOR MANUFACTURING A THIN FILM MAGNETIC HEAD

BACKGROUND OF THE INVENTION

1. Field of the Invention

This invention relates to a thin film magnetic head and a method for manufacturing the same usable for a magnetic recording and reading device such as a magnetic disk device.

2. Related Art Statement

For realizing a high density recording in a magnetic disk device, a recording track width to be wrote by a thin film magnetic head has become extremely narrower to, for example, not more than 1.0 μm. A width of a pole part in the thin film magnetic head is required to be narrower for obtaining such an extremely narrow track-width, and as its means, it is known that an air bearing surface (hereinafter, abbreviated to "ABS") of a slider opposite to a magnetic recording medium is processed. In the case of such a technique to obtain the extremely narrow track-width, the surface of the slider opposite to the magnetic recording medium is polish-processed, etc., to form a gap having a given depth, and thereafter the area containing the magnetic film constituting the pole part is dug up to form a trim structure. Or a pattern is formed on the ABS by a photolithography technique and the ABS is processed along the formed pattern by ion-milling, etc. For example, [IEEE Transactions on Magnetics], Vol. 27, No. 6, November 1991 discloses the technique that a width of a pole part exposed to an ABS is reduced by converging ion beam. Moreover, [IEEE Transactions on Magnetics], Vol. 30, No. 6, November 1994 discloses the technique that a width of a pole part to define a track width is reduced.

One of the problems in the above conventional techniques is not suitable for mass-production since a complete thin film magnetic bead is processed. The other problem is that in employing the above processing method, for protecting, from oxidization and erosion, the end of the magnetic film constituting the pole part exposed to the bottom face of the thus dug depressed portion, a protective film is required to be formed on the whole surface opposite to the recording medium containing the ABS and the depressed portion. The protective film is generally made of diamond-like carbon (hereinafter, abbreviated to "DLC"). As the thickness of the protective film is increased, the amount of the material to be stuck to the ABS of which the protective film is made is obviously increased, so that spacing loss is rose up and thereby electromagnetic conversion characteristics are degraded.

The above problems is not only peculiar to the digging process to narrow the track width, but also is brought about to the case of digging up the area containing the pole part.

SUMMARY OF THE INVENTION

It is an object of the present invention to provide a thin film magnetic head having a narrowed recording track-width.

It is another object of the present invention to provide a thin film magnetic head having an excellent overwrite characteristic.

It is still another object of the present invention to provide a thin film magnetic head capable of reducing its spacing loss.

It is further object of the present invention to provide a thin film magnetic head capable of protecting a magnetic film constituting a pole part from oxidization and erosion, etc.

The present invention also relates to a method for manufacturing a thin film magnetic head and its object is to provide the manufacturing method suitable for manufacturing the above thin film magnetic head.

A thin film magnetic head according to the present invention comprising:

a slider having an air bearing surface opposite to a magnetic recording medium, an inductive type thin film magnetic head including a first magnetic film having a first pole part of which the forefront surface is exposed to the air bearing surface and a first yoke part extending to the opposite side of the air bearing surface from the first pole part, a second magnetic film having a second pole part opposite to the first pole part of the first magnetic film via a gap film and extending to the opposite side of the air bearing surface from the second pole part to be connected to the first yoke part of the first magnetic film, a thin film coil wound so as to be capable of passing through the magnetic circuit surrounded by the first and the second magnetic films and supported by an insulated film, and a protective film to cover the first and second magnetic films, the gap film and the thin film coil, the inductive type thin film magnetic head being supported by the slider and constituting an inductive type thin film magnetic head element, wherein:

the forefront surface in the air bearing surface side of the second yoke part of the second magnetic film is receded from the air bearing surface and the second pole part has a first step d1 in the running direction of magnetic recording medium and a second step d2 in the perpendicular direction to the running direction, and the protective film embeds the first and the second steps between the periphery of the forefront surface of the yoke forefront surface and the second pole part.

In the thin film magnetic head according to the present invention, the forefront face, the boundary between the second yoke part and the second pole part is receded from the ABS, and the second pole part having steps to the periphery of the ABS is elongated to the ABS from the forefront face of the yoke. Thus, the magnetic flux generated from the thin film coil flows to the second pole part from the second yoke part and thereby is efficiently conducted to the forefront face of the second pole part, resulting in the development of the overwrite characteristic.

Moreover, since the inductive type thin film magnetic head element is entirely covered with the protective film, it can be protected with the protective film. The protective film covers the thin film magnetic head, and besides, it embeds the steps between the periphery of the yoke forefront surface and the second pole part. In the second pole part, the forefront surface of the first and the second pole parts, which is needed for magnetic conversion, are to be exposed to the outside and the side, etc. of the second pole part is covered with the protective film. Thus, the magnetic film constituting the second pole part can be protected from oxidation and erosion.

Moreover, since the side, etc. of the second pole part is covered with the protective film indispensable to protect the inductive type thin film magnetic head element, a protective film made of DLC, etc. may be formed in a minimum thickness. Thus, the increase of the spacing loss due to the protective film can avoided and its electromagnetic conversion characteristics can be improved.

The thin film magnetic head according to the present invention can have the second pole part having a width of not more than 1 μm. In this case, it is preferable, for balancing each part of the magnetic head and obtaining good characteristics, that the yoke forefront surface of the second yoke part is receded from the ABS by 0.1–1.5 µm and the first and second steps d1 and d2 are 0.1–4 µm and 0.1–5 µm, respectively.

Moreover, in the preferred embodiment of the thin film magnetic head according to the present invention, the second magnetic film includes a main magnetic film and a subsidiary magnetic film, the main magnetic film being opposite to the insulated film to form the second pole part and being extended backward to the ABS to be connected to the first magnetic film, the subsidiary magnetic film being formed in the opposite side to the opposing surface of the main magnetic film to the insulated film to constitute the yoke forefront surface.

Moreover, in the thin film magnetic head according to the present invention, the gap film is formed so as to cover the first magnetic film almost entirely and the insulated film is provided on the gap film. The yoke forefront surface may rise up on the gap film in the forefront of the insulated film in the ABS side or in the position near the ABS from the forefront of the insulated film. Particularly, the latter structure is effective for reducing a dimension of Throat Height.

Furthermore, it is preferable to remove the gap film and the part of the first magnetic film in its thickness around the one side or the both sides of the first pole part, thereby to form a depressed portion to define the width of the first pole part. In the case of forming depressed portions in the both sides of the first pole part, the first pole part can have a width almost equal to that of the second pole part as they are viewed from the ABS.

Moreover, the thin film magnetic bead according to the present invention preferably has a laminated magnetoresistive effective element besides the inductive type thin film magnetic head element.

This invention is also relates to a method for manufacturing a thin film magnetic head in which a first magnetic film, a gap film and a thin film coil supported by an insulated film are formed on a substrate to be a slider and thereafter a second magnetic film is formed, the step of forming the second magnetic film comprising the steps of:

forming a main magnetic film having a pole part opposite to the first magnetic film via the gap film and a yoke part connected to the first magnetic film backward in the opposite side of the pole part, forming a pattern of resist around the main magnetic film so as to cover the pole part of the main magnetic film and leave a space between itself and the sides of the pole part in the area within the yoke part from the pole part, and forming a subsidiary magnetic film in the area surrounded by the resist pattern.

In the present invention, the step of forming the subsidiary magnetic film within the area surrounded by the resist pattern may be performed by a electroplating method or a sputtering method.

Moreover, in the preferred embodiment of the manufacturing method of the thin film magnetic head according to the present invention, the gap film and the first magnetic film are partially removed in the both sides in its width direction of the pole part before or after the subsidiary magnetic film is formed, to form depressed portions. In the former case, it is preferable to stick a non-magnetic film at least on the exposed surface, formed by the above removing, of the first magnetic film before forming the subsidiary magnetic film.

BRIEF DESCRIPTION OF THE DRAWINGS

For a better understanding of this invention, reference is made to the attached drawings, wherein:

FIG. 2 is a cross sectional view showing the thin film magnetic head of FIG. 1, FIG. 3 is a partially enlarged perspective view showing the structure of the pole part in the thin film magnetic bead shown in FIGS. 1 and 2, FIG. 4 is a partially enlarged perspective view showing the end of the pole part in the thin film magnetic head shown in FIGS. 1 and 2, FIG. 5 is a graph showing the relation between the track width and the overwrite characteristic, FIG. 9 is a cross sectional view showing a fourth embodiment of the thin film magnetic head according to the present invention, FIG. 10 is a partially enlarged perspective view showing the structure of the pole part in a third embodiment of the thin film magnetic head shown in FIG. 9, FIG. 11 is a cross sectional view showing a manufacturing steps of the thin film magnetic head in the first embodiment shown in FIGS. 1–4, FIG. 12 a cross sectional view, taken on line "12—12" of FIG. 11, FIG. 13 a plan view of the pole part of the thin film magnetic head shown in FIG. 11, FIG. 14 is a cross sectional view showing a step after the step in FIG. 11, FIG. 15 is a cross sectional view, taken on line "15—15" of FIG. 14, FIG. 16 is a plan view of the pole part of the thin film magnetic head shown in FIG. 14, FIG. 17 is a cross sectional view showing a step after the step in FIG. 14, FIG. 18 is cross sectional view, taken on line "18—18" of FIG. 17, FIG. 19 is a plan view of the pole part of the thin film magnetic head shown in FIG. 17, FIG. 20 is a cross sectional view showing a step after the step in FIG. 17, FIG. 21 is a cross sectional view, taken on line "21—21" of FIG. 20, FIG. 22 is a plan view showing the pole part of the thin film magnetic head shown in FIG. 20, FIG. 23 is a cross sectional view showing a step after the step in FIG. 20, FIG. 24 is cross sectional view, taken on line "24—24" of FIG. 23, FIG. 25 is a cross sectional view showing a manufacturing step in the third embodiment of the thin film magnetic head, shown in FIG. 8, according to the present invention, FIG. 26 is a cross sectional view, taken on line "26—26" of FIG. 25, FIG. 27 is a plan view showing the pole part of the thin film magnetic head shown in FIG. 25, FIG. 31 is a cross sectional view showing a step after the step in FIG. 28, FIG. 32 is a cross sectional view, taken on line "32—32" of FIG. 31, FIG. 36 is a cross sectional view showing a step after the step in FIG. 33, FIG. 37 is a cross sectional view, taken on line "37—37" of FIG. 36, FIG. 38 is a plan view of the pole part of the thin film magnetic head shown in FIG. 36, FIG. 42 is a cross sectional view showing a step after the step in FIG. 39, FIG. 43 is a cross sectional view, taken on line "43—43" of FIG. 42, FIG. 44 is a plan view showing the pole part of the thin film magnetic head shown in FIG. 42, FIG. 45 is a cross sectional view showing a step after the step in FIG. 42, FIG. 46 is a cross sectional view, taken on line "46—46" of FIG. 45

FIG. 47 is a plan view showing the pole part of the thin film magnetic head shown in FIG. 45.

DETAILED DESCRIPTION OF PREFERRED EMBODIMENTS

Figure 1:
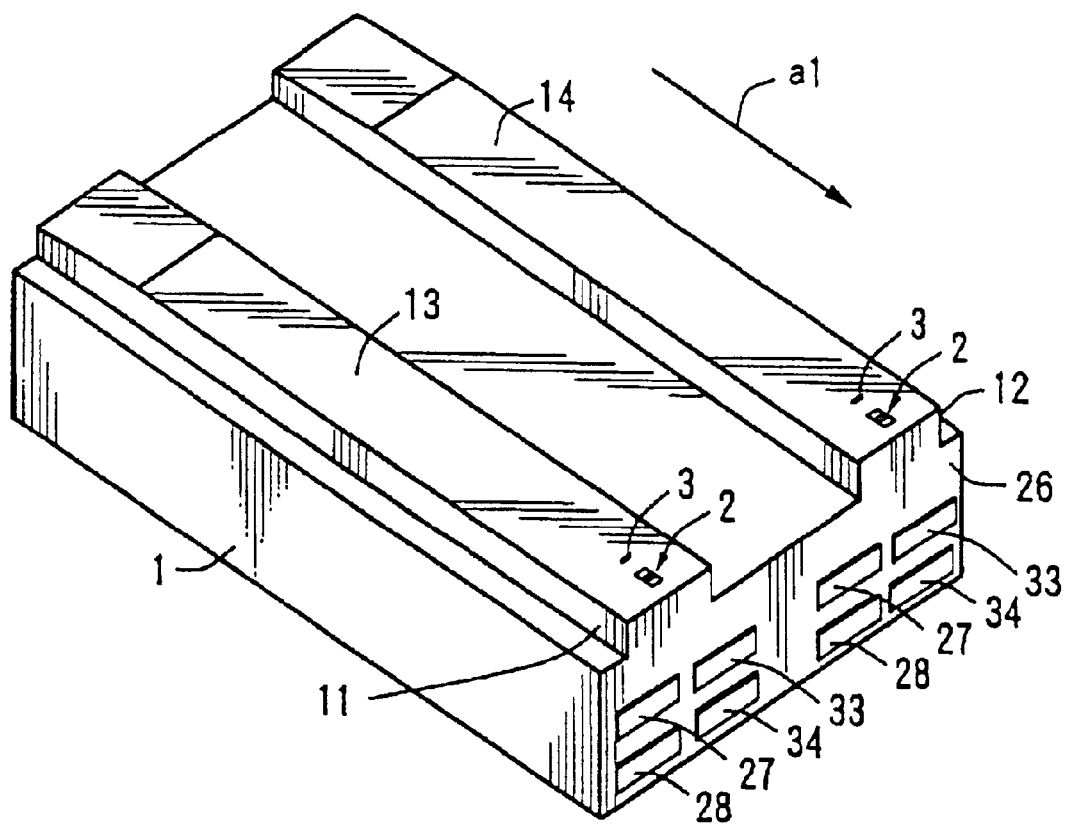
FIG. 1 is a perspective view showing a first embodiment of the thin film magnetic head according to the present invention.

FIG. 1 is a perspective view showing a first embodiment of the thin film magnetic head according to the present invention, FIG. 2 is a cross sectional view showing the thin film magnetic head of FIG. 1, FIG. 3 is a partially enlarged perspective view showing the structure of the pole part in the thin film magnetic head shown in FIGS. 1 and 2, and FIG. 4 is a partially enlarged perspective view showing the end of the pole part in the thin film magnetic head shown in FIGS. 1 and 2. For clarifying the features of the present invention, in these figures, the dimension of each part of the thin film magnetic head is different from that in the practical one. The thin film magnetic head in this embodiment has a slider 1, an inductive-type thin film magnetic head 2 formed so as to be supported by the slider, a magnetoresistive-type thin film magnetic head 3 and two pairs of composite type thin film magnetic head, of which the entire part is covered with a protective layer 26.

Rail parts 11 and 12 are formed on the face of the slider 1 opposite to a recording medium, and the surfaces of the rail parts are used as ABSs 13 and 14. The number of the rail part is not limited to two. For example, the thin film magnetic head may have one to three rail parts, or no rail part. Moreover, for improving a floating characteristic or the like, the face of the slider 1 opposite to a recording medium may have various geometrical shapes. The present invention may be applied to every type of the above configuration. The slider 1 is made of ceramic material such as AlTiC.

The inductive type thin film magnetic head 2, supported with the slider 1, has a first magnetic thin film 21, a gap film 24, a second magnetic thin film 22, thin film coil 23, insulated films 25 and a protective film 26. The first magnetic film 21 has a first pole part 210. The thin film coil 23 is supported with the organic insulated layer 25. The first magnetic layer 21, the gap film 24, the second magnetic film 22, the thin film coil 23, the organic insulated film 25 and the protective film 26 are formed, of the materials well known to them, in thicknesses and patterns well known to the ordinary person skilled in the art, respectively. Moreover, they may be made by an ordinary means. The concrete examples in the above films are described as follows:

The first magnetic film 21 is formed, of a soft magnetic material such as NiFe, CoFe, CoFeNi, in a thickness of 0.5–4 $\mu$m. The film may be formed by a plating method, a sputtering method or the like.

The second magnetic film 22 is formed, of a soft magnetic material such as NiFe, CoFe, CoFeNi, in a thickness of 3–5 $\mu$m. The film may be formed by a frame plating method or the like. The detailed description about the plating is concretely explained in a manufacturing method according to the present invention.

The thin film coil 23 are formed of a conductive material such as Cu, etc. The thickness of the thin film coil is preferably 2–5 $\mu$m. The thin film coil 23 is preferably formed by a frame-plating method or the like.

The gap film 24 may be formed of a non-magnetic insulated material such as $Al_2O_3$, $SiO_2$ or a non-magnetic metallic material. In the case of forming the gap film of the non-magnetic insulated material, a sputtering method is preferably used. In the case of forming of the non-magnetic metallic material, a plating method or a sputtering method may be used. Its thickness is preferably 0.01–0.5 $\mu$m.

The insulated films 25 is preferably formed by curing a photoresist material. The layer-number and the thickness of the insulated film 25 change depending on the layer-number of the thin film coil 23 and the supporting structure of the thin film coil. Generally, its thickness is 3–20 $\mu$m.

The protective film 26 may be formed of an insulated material such as $Al_2O_3$, $SiO_2$, etc. Its thickness is preferably 5–50 nm. The film may be formed by a sputtering method or the like.

The second magnetic film 22 has a second pole part 220 and a yoke part 221. The backside of the yoke part 221 to the ABS 13 or 14 as a position-standard is magnetically connected to the first magnetic film 21, and the forefront surface 222 of the yoke is receded from the ABS 13 or 14 and rises up almost perpendicular to the surface of the gap film 24. The yoke part 221 is attached to the insulated film 25 to support the thin film coil 23.

The second pole part 220 is opposite to the first pole part 210 via the gap film 24. The second pole part 220 has a step d1 in a running direction a1 of a magnetic recording medium within the yoke forefront surface 222 almost parallel to the ABS 13 or 14. Moreover, the second pole part 220 has a width smaller than that of the yoke forefront surface 222 so that it can have a step d2 in a perpendicular direction to the running directional. The second pole part 220 extends to the ABS 13 or 14 from the yoke forefront surface 222 and its pole surface 223 constitutes a part of the ABS 13 or 14. The first pole part 210 is composed of the opposite part of the first magnetic film 21 to the second pole part 220, both of the first and the second pole parts sandwiching the gap film 24.

The thin film coil 23 constitutes a thin film magnetic circuit as well as the first magnetic film 21, the second magnetic film 22 and the gap film 24. The thin film coil is supported by the insulated film 25 and is so formed that it can wind around the connection of the yoke part. Both ends of the thin film coil 23 is conducted to take out electrodes 27 and 28 (see FIG. 1). The winding number and the layer-number of the thin film coil 23 is not restricted. In this embodiment, the thin film coil 23 has a two-layered structure.

The protective film 26 embeds the steps d1 and d2 between the periphery of the yoke forefront surface and the second pole part 220, and covers the inductive type thin film magnetic head 2 entirely.

In the thin film magnetic head according to the present invention, the slider 1 has the ABSs 13 and 14 in the opposite side to a medium and the inductive type thin film magnetic head 2 is provided on the slider 1, so that the thin film magnetic head may be used as a floating type thin film magnetic head which is employed with a magnetic recording medium such as a magnetic disk.

As above-mentioned, in the inductive type thin film magnetic head 2 according to the present invention, the forefront surface 222 of the yoke part 221 in the second magnetic film 22 is receded from the ABSs 13 and 14, and the second pole part 220 is so formed that it can have the steps d1 and d2 to the periphery of the yoke forefront surface 222. Thus, the magnetic flux generated by making a writing current flow in the thin film coil 23 can be converged effectively between the first and the second pole parts 210 and 220, and thereby a writing magnetic field can be generated in the gap film 24 between the pole parts 210 and 220.

The yoke part 221 of the second magnetic film 22, of which the backside is magnetically connected to the first magnetic film 21, can make flow the magnetic flux generated from the writing current in the thin film coil 23 between the first and the second pole parts 210 and 220, effectively.

The second pole part 220 has the steps d1 and d2 within the periphery of the yoke forefront surface 222 and extends to the ABSs 13 and 14 from the forefront surface 222, of which the pole surface 223 constitutes parts of the ABSs 13 and 14. In other words, the second pole part 220 has the width which decreases by the step d2 within the periphery of the yoke forefront surface from the width W20 of the yoke forefront surface 222 in a track direction. Thus, the second pole part 220 has the width W21 narrowed, by the step d2 within the periphery of the yoke forefront surface 222, from the width of the pole surface 223 in the track direction constituting the ABSs 13 and 14. As a concrete numeric value, the track width W21 of the pole surface 223 is not more than 1 $\mu$m, the length "L1" of the second pole part 220 being 0.1–1.5 $\mu$m, the width W20 of the yoke forefront surface 222 being 2 $\mu$m, the step d1 being 0.1–4 $\mu$m, the step d2 0.1–5 $\mu$m and the height h0 being 0.1–4 $\mu$m.

The yoke forefront surface 222 rises up on the gap film 24, and the second pole part 220 has the steps d1 and d2 within the periphery of the yoke forefront surface 222 and extends to the ABSs 13 and 14 within the surface 222. In this case, since the yoke forefront surface 222 is substantially a point of a Throat Height "0", the Throat Height (TH), which is 0.1–1.5 $\mu$m, for example, is defined as the length L1 to the yoke forefront surface 222 from the pole surface 223 of the second pole part 220 constituting the ABSs. It enables a sufficient writing magnetic flux to be supplied up to the yoke forefront surface 222 and the supplied magnetic flux to be effectively conveyed the pole surface 223 of the second pole part 220, resulting in the enhancement of the overwrite characteristics.

FIG. 5 shows data graphing the relation between the track width W21 ($\mu$m) and the overwrite (dB). In the figure, the abscissa axis depicts the track width w21 ($\mu$m) and the longitudinal axis depicts the overwrite (dB). The curve L1 shows the overwrite characteristic in the thin film magnetic head according to the present invention and the curve L2 shows the overwrite characteristic in the conventional thin film magnetic head (d1, d2=0).

As shown in the figure, the thin film magnetic head according to the present invention has a much better overwrite characteristic than the conventional thin film magnetic head within the track width of 1.0–2.0 $\mu$m. Besides, the thin film magnetic head according to the present invention has a remarkably small degree of the overwrite characteristic-degradation to the narrowing the track width W21. Thus, if the track width W21 is decreased to 1.0 $\mu$m, the thin film magnetic head according to the present invention has the overwrite characteristic equal to that of the conventional thin film magnetic head in its track width of 2.0 $\mu$m. Moreover, if the thin film magnetic head according to the present invention has the track width W21 of 0.8 $\mu$m smaller than 1.0 $\mu$m, it is easily estimated that it can have the overwrite characteristic not less than 35 dB.

Moreover, the inductive type thin film magnetic head according to the present invention may be entirely protected with the protective film 26. It enables the steps d1 and d2 between the second pole part 220 and the periphery of the yoke forefront surface 222 to be embedded. Of the second pole part 220, only the pole surface 223 needed in magnetic conversion is exposed to the ABSs 13 and 14. The side, etc. of the second pole part 220 is covered with the protective film 26. Thus, the magnetic film constituting the second pole part 220 can be protected from oxidation and erosion.

Since the side, etc. of the second pole part 220 is covered with the protective film 26 indispensable to protect a magnetic conversion element, a protective film made of DLC, etc. may be formed in a minimum thickness. Thus, the increase of the spacing loss can be avoided and its electromagnetic conversion characteristic can be improved.

The thin film magnetic head according to the present invention shown in FIGS. 1 to 4, in which the inductive type thin film magnetic head 2 is exclusive for writing and which has a MR element 3 for reading, is a composite type. In this embodiment, although such composite type thin film magnetic heads 2 and 3 are provided in the ends of the rail parts 11 and 12 in a recording medium-moving direction a1, respectively, a pair of composite type thin film magnetic head may be provided on either the rail part 11 or 12. The recording medium-moving direction a1 corresponds to an outflow direction of an air when the recording medium moves at high speed. In the backside of the inductive type thin film magnetic head 2 as is viewed in the recording medium-moving direction a1 are provided the electrodes 27, 28 connected to the inductive type thin film magnetic head 2 and electrodes 33, 34 connected to the MR element 3.

As the MR element 3, various layered structures are suggested and practically used up to now. The MR element 3 may be composed of an anisotropically magnetoresistive effective element made of permalloy, etc, a giant magnetoresistive (GMR) effective film and the like. Moreover, it may be so composed that it may use a tunnel connection-magnetoresistive (TMR) effect. However, the MR element in the present invention may be composed of every kind of layered structure as above-mentioned The MR element 3 is positioned in the insulated film 32 between a first shielding film 31 and the first magnetic film 21 doubling as a second shielding film. The insulated film 32 is made of alumina, etc. The MR element 3 is connected to the electrodes 33 and 34 (see, FIG. 1) with a leading conduction 35 (see, FIG. 2).

In this embodiment, since the first magnetic film 21 constituting the bottom magnetic film of the magnetic conversion element 2 doubles as the second shielding film for the MR element 3, its thickness is almost constant and its one surface is plane. The gap film 24 is attached to the plane one surface of the first magnetic film 21.

Among the first and the second magnetic films 21 and 22, the second magnetic film 22 has a main magnetic film 224 and a subsidiary magnetic film 225. The main magnetic film 224 is formed on the surface of the insulated film 25 by a plating method, for example, constituting the second pole part 220. The backside of the main magnetic film 224 is connected to the first magnetic film 21. The main magnetic film 224 may be formed by a sputtering method.

The subsidiary magnetic film 225 is formed on the main magnetic film 224 by an electroplating method, a sputtering method, etc. The yoke forefront surface 222 constitutes the end of the subsidiary magnetic film 225.

The above construction can make small the Throat Height (TH) and improve the overwrite characteristic by controlling the position of the yoke forefront surface 222 in the subsidiary magnetic film 225 to the main magnetic film 224.

Moreover, a required characteristic can be improved by enhancing the magnetic efficiency of the second magnetic film 22 and making different the magnetic characteristics of the main magnetic film 224 and the subsidiary magnetic film 225.

For example, if the saturated magnetic flux density of the main magnetic film 224 is larger than that of the subsidiary magnetic film 225, the high frequency recording characteristic can be improved. In this case, the subsidiary magnetic film 225 is made of a permalloy having a composition of Ni(80%)—Fe(20%) and the main magnetic film 224 is made of a permalloy having a composition of Ni(50%)—Fe(50%). As another means to improve the high frequency recording characteristic, it is effective to make large the resistivity of the main magnetic film 224 than that of the subsidiary magnetic film 225.

It is also effective to make large the wear resistance of the main magnetic film 224 than that of the subsidiary magnetic film 225. In this case, the wear of the main magnetic film 224 adjoining the gap film 24 and defining the gap thickness can be avoided and thereby a stable electromagnetic conversion characteristic can be obtained. Although its detail description is omitted, the first magnetic film 21 may be composed of the above-mentioned structure. Moreover, a depressed portion may be formed on a surface of a substrate and main parts such as a coil part of an inductive type thin film magnetic head may be provided in the depressed portion.

Such a structure can make small a size of a thin film magnetic head.

Figure 6:
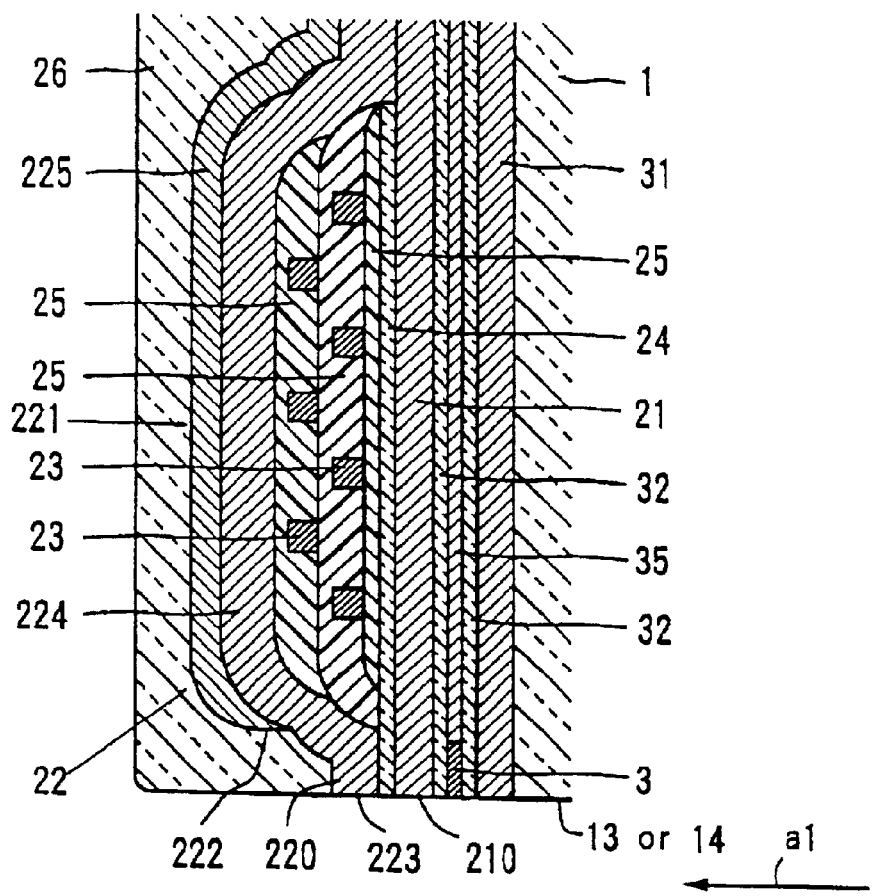
FIG. 6 is a cross sectional view showing a second embodiment of the thin film magnetic head according to the present invention.
Figure 7:
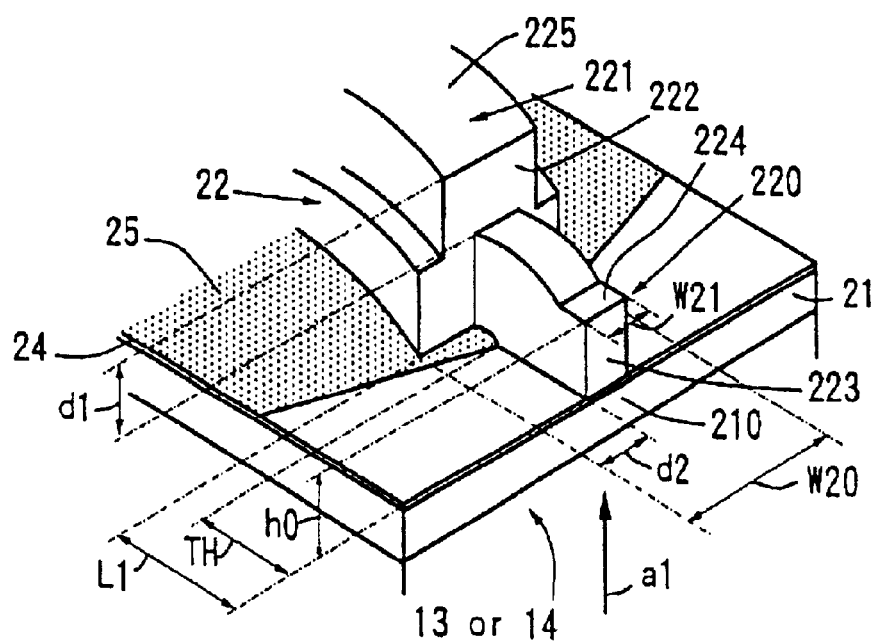
FIG. 7 is a partially enlarged perspective view showing the structure of the pole part in the thin film magnetic head shown in FIG. 6.

FIG. 6 is a cross sectional view showing a second embodiment of the thin film magnetic head according to the present invention, and FIG. 7 is a perspective view enlargedly showing the pole part of the thin film magnetic head shown in FIG. 6. The similar parts in the figures to ones in FIGS. 1 to 4 are depicted by the same references. In this embodiment, the yoke forefront surface 222 of the second magnetic film 22 rises up on the insulated film 25. In this case, since a point of a Throat Height "0" is defined as the periphery of the insulated film 25 which is starting point of the rising up of the second pole part 220, the Throat Height (TH) is a distance to the periphery of the insulated film 25 from the pole forefront surface 223.

In this embodiment, since the yoke forefront surface 222 is positioned nearby the Throat Height "0", a sufficient magnetic flux can be supplied to the throat Height "0". Thus, the overwrite characteristic can be much enhanced.

Figure 8:
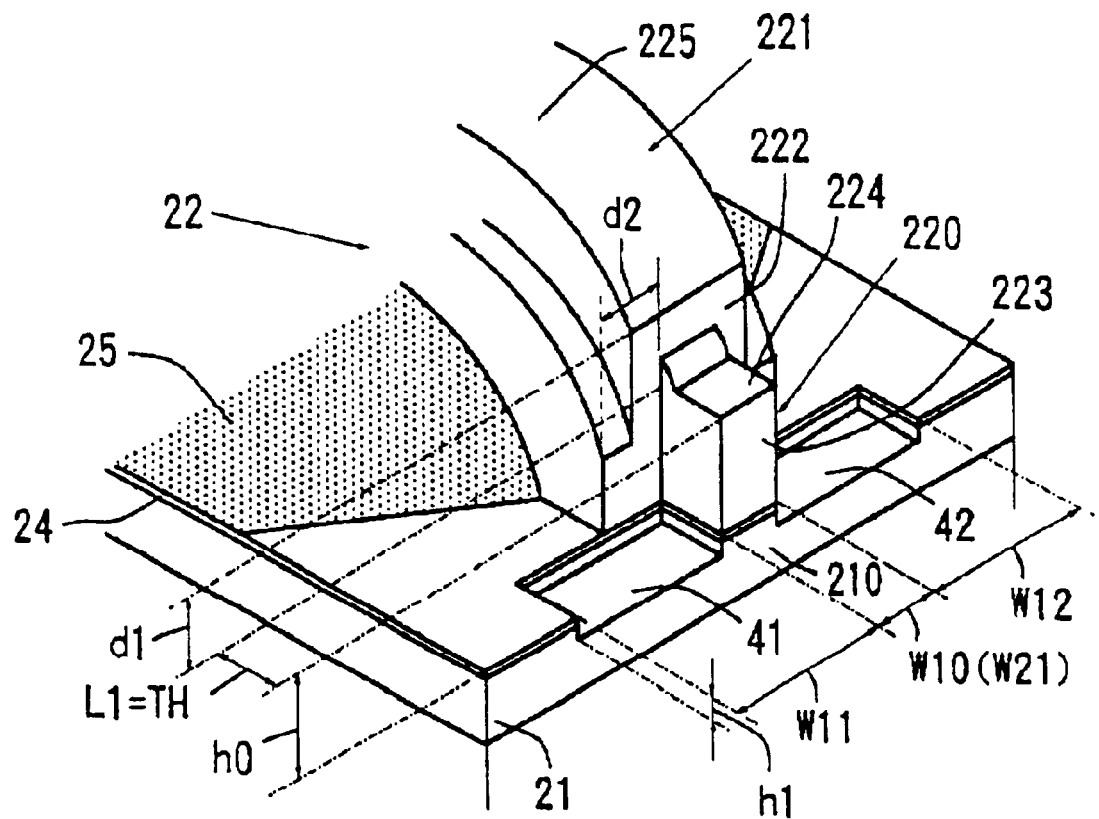
FIG. 8 is a partially enlarged perspective view showing the structure of the pole part in a third embodiment of the thin film magnetic head.

FIG. 8 is a perspective view showing a third embodiment of the thin film magnetic head according to the present invention. The similar parts in the figures to ones in FIGS. 1 to 4 are depicted by the same references. The thin film magnetic head shown in thin embodiment has depressed portions 41 and 42. The depressed portions 41 and 42 are formed in the removed part of the gap film 24 in the edge portion composed of the yoke forefront surface 222 and the second pole part 220. Moreover, the portions have a depth of h1 which partially reduces the surface of the first magnetic film 21. The depressed portions 41 and 42 are positioned in the both side of the first pole part 210, respectively. The yoke forefront surface 222 of the second magnetic layer 22 is positioned on the gap film 24 or the insulted layer 25 in the outside of the depressed portions 41 and 42.

The above structure exhibits the same operation-effect as one in the embodiment shown in FIGS. 1 to 4. Moreover, the structure can define the track widths W10 and W20 of the first and the second pole parts 210 and 220 and thereby the thin film magnetic head suitable for high density-recording without sidefringing, etc. can be obtained. The track width W10 of the first pole part 210 is almost equal to the track width w20 of the second pole part 220 as they are viewed from the ABSs 13 and 14. The depth h1 of the depressed portions 41 and 42 are set to 0.1–0.5 µm, for example.

Not illustrated, in the structure shown in FIG. 8, the yoke forefront surface 222 may be rose up on the insulated film 25 (see, FIGS. 6 and 7).

FIG. 9 is a cross sectional view showing still another embodiment of the thin film magnetic bead according to the present invention, and FIG. 10 is a perspective view enlargedly showing the pole part of the thin film magnetic head of FIG. 9. In these figures, the similar parts in the figures to ones in FIGS. 1 to 4 are depicted by the same references. In thin embodiment, the interior surfaces of the depressed portions 41 and 42 are covered with non-magnetic film 226. The yoke forefront surface 222 rises up on the surface of the non-magnetic film 226. The non-magnetic film 226 is stuck on the surface of the main magnetic film 224 and cover the bottom surfaces of the depressed portions 41 and 42. The subsidiary magnetic film 225 is stuck on the non-magnetic film 226 and the forefront part of the film 225 is extended into the depressed portions 41 and 42, constituting the yoke forefront surface 222. The subsidiary magnetic film 225 is formed on the non-magnetic film 226 so that it may overlap the interiors of the depressed portions 41 and 42 by an overlapping amount g1. The yoke forefront surface 222 constituting the forefront part of the subsidiary magnetic film 225 rises up on the surface of the non-magnetic film 226 in the depressed portions 41 and 42.

The above structure enables the Throat height TH in the second magnetic film 22, defined as the distance between the yoke-forefront surface 222 composed of the subsidiary magnetic film 225 and the pole surface 223, to be smaller and the overwrite characteristic to be improved. Since the forefront of the yoke part 221 of the second magnetic film 22, including the yoke forefront surface 222, is formed on the non-magnetic film 226 so that it may overlap the interiors of the depressed portions 41 and 42 by the overlapping amount g1, a magnetic short-circuit does not occur between the first and second magnetic films 21 and 22. The non-magnetic film 226 may be preferably made of the similar material to one of the gap film 24, for example, non-magnetic insulated material such as $Al_2O_3$, $SiO_2$ and non-magnetic metallic material. In the case of employing the non-magnetic insulated material, the non-magnetic film 226 may be formed by a sputtering method, etc. In the case of employing the non-magnetic metallic material, the non-magnetic film 226 may be formed by a plating method or a sputtering method. The non-magnetic film may has the thickness equal to that of the gap film 24.

Not illustrated, in the structure shown in FIGS. 9 and 10, the yoke forefront surface 222 may be rose up on the insulated film 25 (see, FIGS. 6 and 7).

A manufacturing method of the thin film magnetic head according to the present invention will be described hereinafter. FIGS. 11 to 24 are views showing steps in manufacturing the thin film magnetic head having the structure shown in FIGS. 1 to 4. Not explained, the steps of FIGS. 11 to 24 may be applied to the thin film magnetic head shown in FIGS. 6 and 7.

First of all, the manufacturing method will be described with reference to FIGS. 11 to 13. FIG. 11 is a cross sectional view showing a manufacturing step of the thin film magnetic head of FIGS. 1 to 4, FIG. 12 an end view, taken on line "12—12", and FIG. 13 a plan view partially showing the thin film magnetic head of FIGS. 11 and 12.

As is illustrated, the first magnetic film 21, the gap film 24 and the thin film 23 supported by the insulated film 25 are formed on the substrate 1 to be the slider by a well known means to an ordinary person skilled in the art and thereafter the main magnetic film 224 is formed. The main magnetic film 224 has the yoke part 221 and the pole part 220. The pole part 220, of which the one end is connected to the yoke part 221, is so formed that it may be opposite to the first magnetic film 21 via the gap film 24. The backside of the yoke part 221 is magnetically connected to the first magnetic film 21. The main magnetic film 224 may be formed by an electroplating method, a sputtering method or a method combining these methods. The thickness of the main magnetic film 224 is about 3 µm. In the case of forming the main magnetic film 224 by the electroplating method, a plated underfilm to be a seed layer is formed, by a conventional sputtering method, on the surface of the insulated film 25, in advance when an area to stick a plated film is an insulated area such as the surface of the insulated film 25 to support the thin film coil 23.

Next, as is shown in FIGS. 14 to 16, a pattern made of a resist 51 is formed around the main magnetic film 224. . The pattern of the resist 51 covers the pole part 220 within the intermediate part from the forefront part of the pole part 220 and is so formed that it can have the spaces 52 and 53 between itself and the side of the pole part 220 within the yoke part 221 from the intermediate part. The resist 51 comes across the pole part 220 on the gap film 24, and does not overlap the insulated film 25. The resist 51 having such a pattern can be formed by photolithography technique. In the case of forming the thin film magnetic head shown in FIGS. 6 and 7, the resist 51 is so formed that it may come across the pole part 220 on the insulated film 25 in FIGS. 14 to 16.

Subsequently, as shown in FIGS. 17 to 19, the subsidiary magnetic film 225 is formed within the area surrounded by the resist 51. The subsidiary magnetic film 225 is stuck on the surface of the yoke part 221 in the main magnetic film 224 and on the surface and the side of pole part 220 within the spaces 52 and 53 (see, FIGS. 15 and 16). The subsidiary magnetic film 225 is composed of a permalloy-plated film, for example. Its thickness is around 3 µm. In the case that an area to be plated is insulative, as above-mentioned, the plated underfilm is formed on the area. The main magnetic film 224 and the subsidiary magnetic film 225 may have different compositions, each other, as above-mentioned.

Next, as shown in FIGS. 20 to 22, the resist 51 is peeled off. The resist 51 may be peeled off by a well known chemically means to an ordinary person skilled in the art. By peeling off the resist 51, the yoke forefront surface 222 to define the Throat Height "0" is formed in the forefront surface of the subsidiary magnetic film 225 contacting to the resist 51.

Thereafter, as shown in FIGS. 23 and 24, the protective layer 26 is stuck. The protective layer 26 may be formed, by a sputtering method, for example, of a well known material such as alumina. The protective film 26 covers the subsidiary magnetic layer 222 constituting a top layer and the insulated film 25 and embeds the steps between the yoke forefront surface 222 composed of the subsidiary magnetic film 225 and the pole part 220 composed of the main magnetic film 224. Thereby, the thin film magnetic head shown in FIGS. 1 to 4 can be obtained.

The above process is performed on a wafer. Not explained, for obtaining the thin film magnetic head as a single part, the wafer is cut, ground, and polished, etc.

FIGS. 25 to 32 are views showing the manufacturing method of the thin film magnetic head shown in FIG. 8. Not explained, the steps shown in FIGS. 25 to 32 may be applied to the thin film magnetic head in which the yoke forefront surface rises up on the insulated film (see, FIGS. 6 and 7).

First of all, the first magnetic film 21, the gap film 24 and the thin film coil 23 supported by the insulated film 25 are formed on the substrate 1 and thereafter the main magnetic surface 224 is formed. The main magnetic film 224 has the yoke part 221 and the pole part 220. The pole part 220, of which the one end is connected to the yoke part 221, is so formed that it may be opposite to the first magnetic film 21 via the gap film 24. The backside of the yoke part 221 is magnetically connected to the first magnetic film 21.

Moreover, by employing the steps shown in FIGS. 14 to 16, the subsidiary magnetic film 225 is formed on the main magnetic film 224. FIGS. 25 to 27 shows the state after forming the subsidiary film 225.

Figure 28:
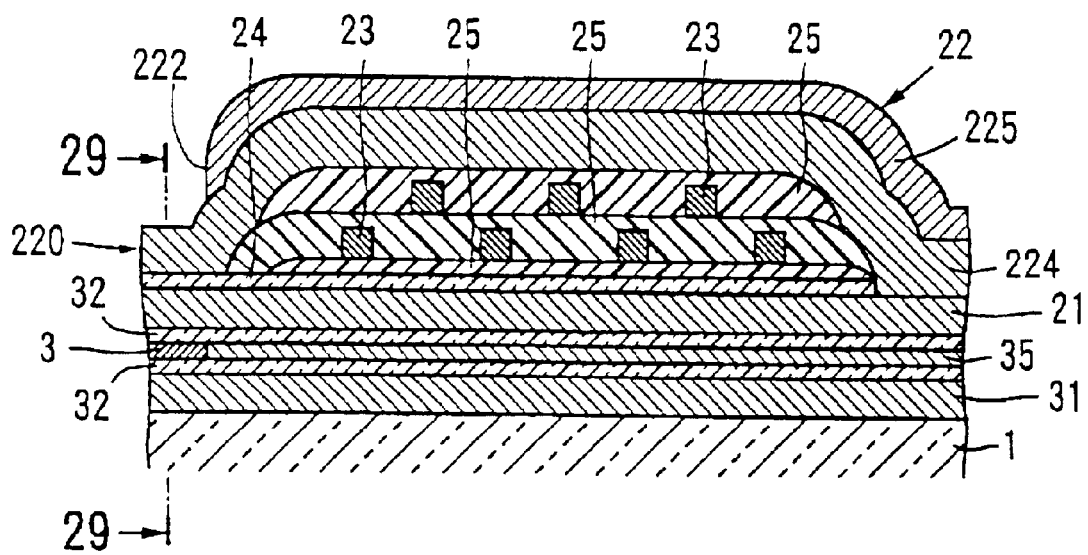
FIG. 28 is a cross sectional view showing a step after the step in FIG. 25.
Figure 29:
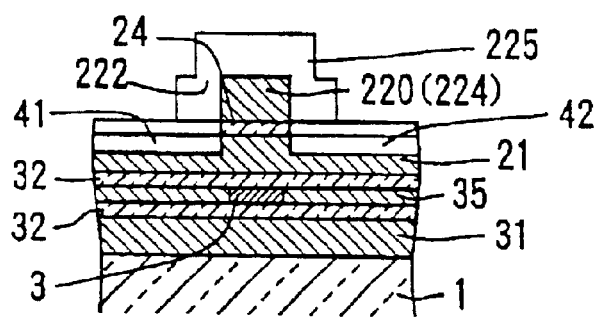
FIG. 29 is a cross sectional view, taken on line "29—29" of FIG. 28.
Figure 30:
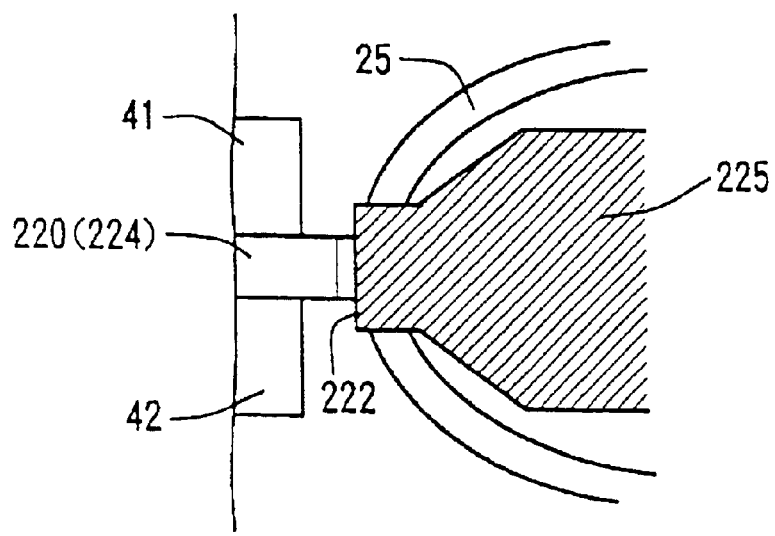
FIG. 30 is a plan view showing the pole part of the thin film magnetic head shown in FIG. 28.

Then, as shown in FIGS. 28 to 30, the gap film 24 and the first magnetic film 21 are partially removed in the both sides in its width direction of the pole part 220 to form the depressed portions 41 and 42. The depressed portions 41 and 42 may be formed by an ion-milling method, etc. Subsequently, the protective film is stuck as shown in FIGS. 31 and 32.

FIGS. 33 to 49 show the manufacturing method of the thin film magnetic head shown in FIGS. 8 and 9. Not explained, the process in FIGS. 33 to 49 may be applied to the thin film magnetic head in which the yoke forefront surface rises up on the insulated film (see, FIGS. 6 and 7).

Figure 33:
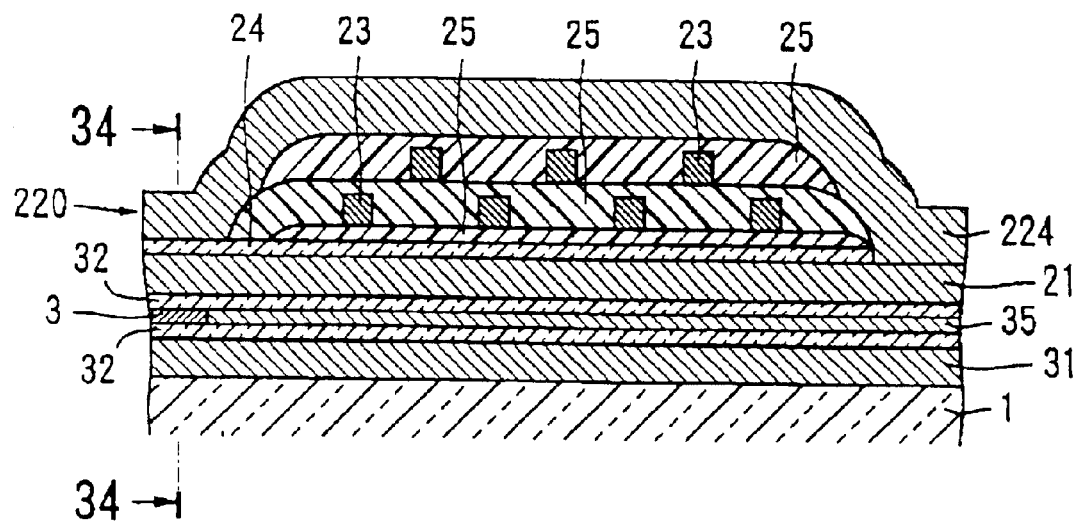
FIG. 33 is a cross sectional view showing a manufacturing step in the fourth embodiment of the thin film magnetic head, shown in FIG. 9, according to the present invention.
Figure 34:
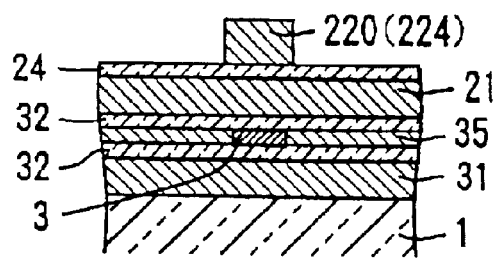
FIG. 34 is a cross sectional view, taken on line "34—34" of FIG. 33.
Figure 35:
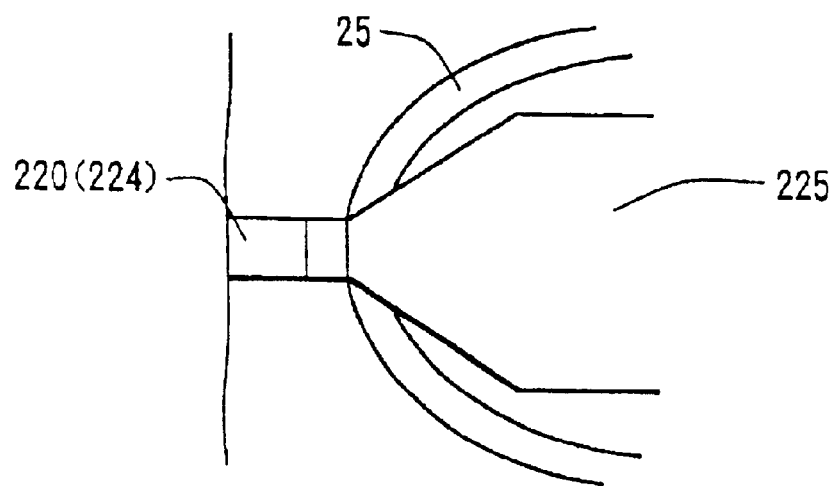
FIG. 35 is a plan view of the pole part of the thin film magnetic head shown in FIG. 33.

First of all, the first magnetic film 21, the gap film 24 and the thin film coil 23 supported by the insulated film 25 are formed on the substrate 1 and thereafter, as shown in FIGS. 33 to 35, the main magnetic surface 224 is formed.

Then, as shown in FIGS. 36 to 38, the gap film 24 and the first magnetic film 21 are partially removed in the both sides in its width direction of the pole part 220 to form the depressed portions 41 and 42. To the bottom surface of the depressed portions 41 and 42 is exposed the surface of the first magnetic film 21.

Figure 39:
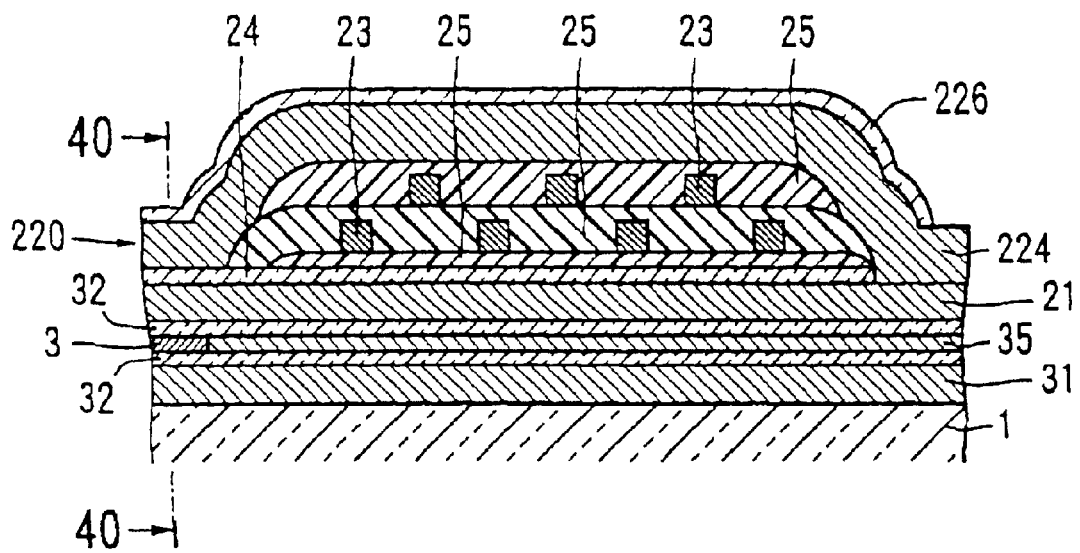
FIG. 39 is a cross sectional view showing a step after the step in FIG. 36.
Figure 40:
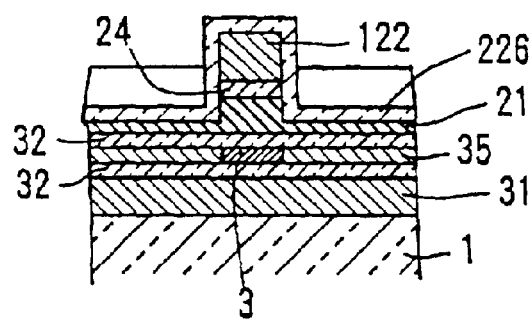
FIG. 40 is a cross sectional view, taken on line "40—40" of FIG. 39.
Figure 41:
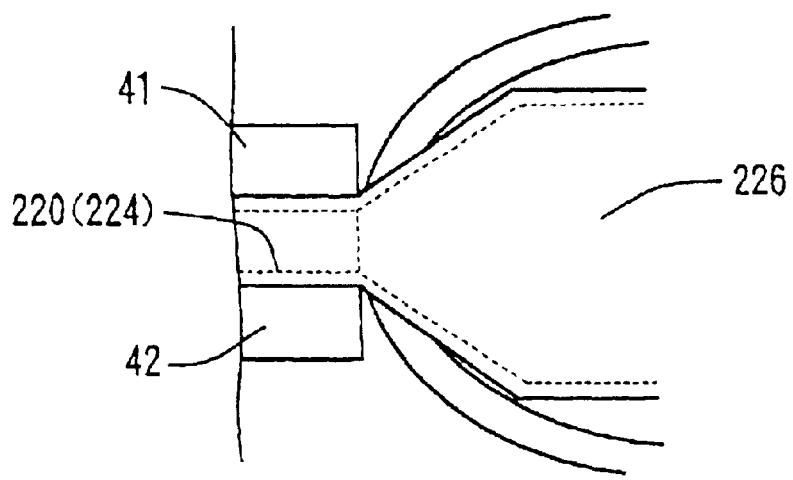
FIG. 41 is a plan view showing the pole part of the thin film magnetic head shown in FIG. 39.

Next, as shown in FIGS. 39 to 41, the non magnetic film 226 is stuck at least on the exposed surface of the first magnetic film 21, which is formed by partially removing the first magnetic film: In this embodiment, the non-magnetic film 226 is stuck on the surfaces of the yoke part 221 of the main magnetic film 224 and the pole part 220. The non-magnetic film 226 may be formed by the plating method or the sputtering method, as above-mentioned.

Subsequently, as shown in FIGS. 42 to 44, the pattern of resist 51 is formed around the main magnetic film 224. The pattern of the resist 51 covers the pole part 220 within the intermediate part from the forefront part of the pole part 220 and has the spaces 52 and 53 between itself and the side of the pole part 220 within the yoke part 221 from the intermediate part. The resist 51 having such a pattern may be formed by a photolithography technique.

Next, as shown in FIGS. 45 to 47, the subsidiary magnetic film 225 is formed within the area surrounded by the resist 51. The subsidiary magnetic film 225 is stuck on the surface of the yoke part 221 in the main magnetic film 224 and on the surface and sides of the pole part 220 within the spaces 52 and 53 (see, FIGS. 43 and 44)

Figure 48:
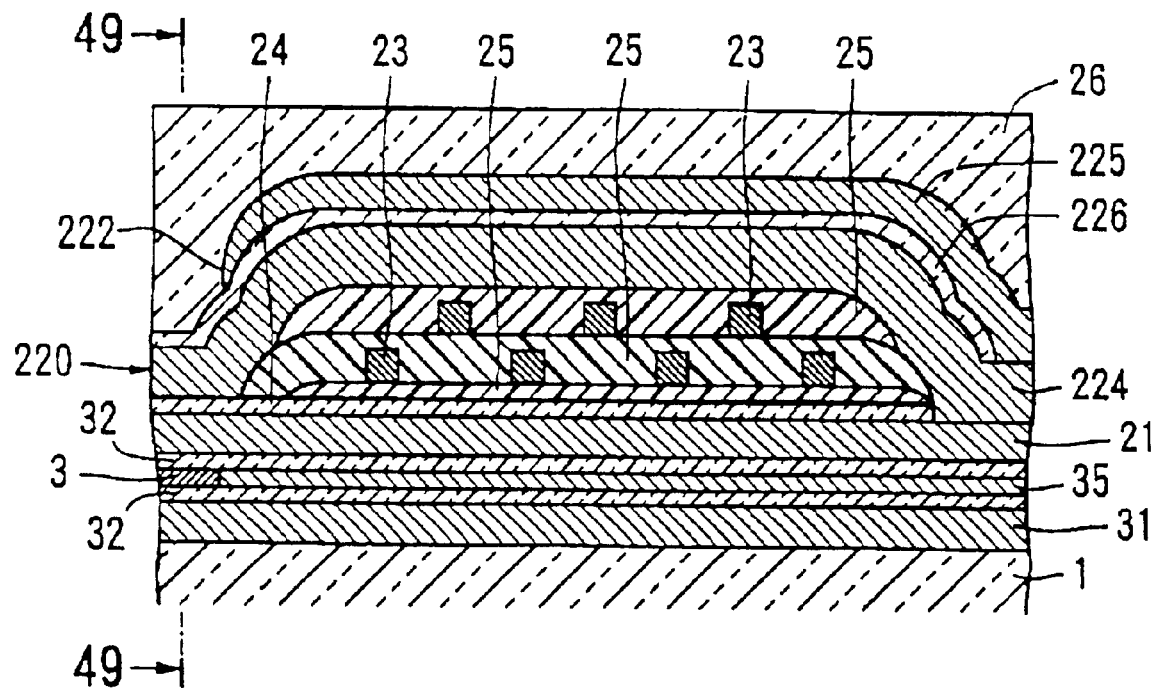
FIG. 48 is a cross sectional view showing a step after the step in FIG. 45.
Figure 49:
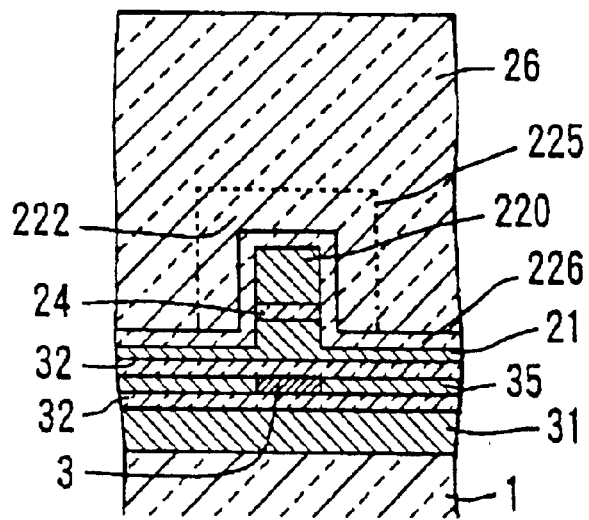
FIG. 49 is a cross sectional view, taken in line "49—49" of FIG. 48.

Then, after the resist 51 is peeled off, the protective film 26 is stuck as shown in FIGS. 48 and 49.

The present invention is explained in detail with reference to the concrete preferred embodiments, but it will be obvious to an ordinary person skilled in the art that its configuration and its details may be variously changed without departing from the spirit and the scope of the invention.

As above-mentioned, the present invention can be provide the following effects:

(a) The thin film magnetic head having a narrowed recording track width can be provided.
(b) The thin film magnetic bead having an excellent overwrite characteristic can be provided.
(c) The thin film magnetic head capable of reducing a spacing loss can be provided.
(d) The thin film magnetic head capable of certainly protecting the magnetic film constituting the pole part from oxidation and erosion, etc. can be provided.
(e) The manufacturing method suitable for the thin film magnetic head can be provided.

What is claimed is:

1. A method for manufacturing a thin film magnetic head, comprising:

forming a first magnetic film, a gap film and a thin film coil supported by an insulated film on a substrate to be a slider; and forming thereafter a second magnetic film including:
forming a main magnetic film having a pole part opposite to the first magnetic film via the gap film and a yoke part connected to the first magnetic film backward in the opposite side of the pole part,
forming a pattern of resist around the main magnetic film so as to cover the pole part of the main magnetic film and leave a space between the pattern of the resist and the sides of the pole part in the area within the yoke part from the pole part, and
forming a subsidiary magnetic film in the area surrounded by the resist pattern; and partially removing the gap film and the first magnetic film in the both sides of the pole part in its width direction, thereby to form a depressed portion, wherein the partial removing of the gap film and the first magnetic film is carried out after the subsidiary magnetic film is formed.

2. The method for manufacturing a thin film magnetic head as defined in claim 1, wherein the subsidiary magnetic layer is formed in the area surrounded by the resist pattern by an electroplating method.

3. The method for manufacturing a thin film magnetic head as defined in claim 1, wherein the subsidiary magnetic layer is formed in the area surrounded by the resist pattern by a sputtering method.

4. A method for manufacturing a thin film magnetic head, comprising:

forming a first magnetic film, a gap film and a thin film coil supported by an insulated film on a substrate to be a slider; and forming thereafter a second magnetic film including:
forming a main magnetic film having a pole part opposite to the first magnetic film via the gap film and a yoke part connected to the first magnetic film backward in the opposite side of the pole part,
forming a pattern of resist around the main magnetic film so as to cover the pole part of the main magnetic film and leave a space between the pattern of the resist and the sides of the pole part in the area within the yoke part from the pole part, and
forming a subsidiary magnetic film in the area surrounded by the resist pattern; and partially removing the gap film and the first magnetic film in the both sides of the pole part in its width direction, thereby to form a depressed portion, wherein the partial removing of the gap film and the first magnetic film is carried out before the subsidiary magnetic film is formed.

5. The method for manufacturing a thin film magnetic head as defined in claim 4, further comprising sticking a non-magnetic film at least on the exposed surface of the first magnetic film formed by partially removing the first magnetic film before the subsidiary magnetic film is formed after the gap film and the first magnetic film are partially removed.

6. The method for manufacturing a thin film magnetic head as defined in claim 4, wherein the subsidiary magnetic layer is formed in the area surrounded by the resist pattern by an electroplating method.

7. The method for manufacturing a thin film magnetic head as defined in claim 4, wherein the subsidiary magnetic layer is formed in the area surrounded by the resist pattern by a sputtering method.

* * * * *